US008826263B2

(12) United States Patent
Ichikawa et al.

(10) Patent No.: US 8,826,263 B2
(45) Date of Patent: Sep. 2, 2014

(54) PORTABLE TERMINAL, PORTABLE TERMINAL CONTROL METHOD, AND PORTABLE TERMINAL CONTROL PROGRAM

(75) Inventors: Tomohiro Ichikawa, Tokyo (JP); Yasuyuki Hirao, Tokyo (JP); Katsumi Aoyagi, Tokyo (JP); Kenji Asa, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 820 days.

(21) Appl. No.: 12/500,876

(22) Filed: Jul. 10, 2009

(65) Prior Publication Data
US 2010/0042985 A1 Feb. 18, 2010

(30) Foreign Application Priority Data

Aug. 12, 2008 (JP) .................................. 2008-208006

(51) Int. Cl.
*G06F 9/44* (2006.01)
*G06F 9/445* (2006.01)
*G06F 9/45* (2006.01)

(52) U.S. Cl.
CPC .. *G06F 8/65* (2013.01); *G06F 8/44* (2013.01); *G06F 8/52* (2013.01)
USPC ...................................... 717/170; 455/432.2

(58) Field of Classification Search
None
See application file for complete search history.

(56) References Cited

U.S. PATENT DOCUMENTS

| 6,349,205 | B1 * | 2/2002 | Fang et al. ..................... 455/419 |
| 6,996,818 | B2 * | 2/2006 | Jacobi et al. .................. 717/170 |
| 7,072,359 | B2 * | 7/2006 | Uchida et al. ................. 370/466 |
| 7,657,886 | B1 * | 2/2010 | Chen et al. .................... 717/170 |
| 7,747,997 | B1 * | 6/2010 | Rao ............................... 717/170 |
| 8,155,694 | B2 * | 4/2012 | Lee ............................ 455/552.1 |
| 2003/0101438 | A1 | 5/2003 | Mishra et al. |
| 2006/0105812 | A1 * | 5/2006 | Shin ............................. 455/558 |

(Continued)

FOREIGN PATENT DOCUMENTS

| EP | 1 635 255 A2 | 3/2006 |
| EP | 1 635 255 A3 | 3/2006 |

(Continued)

OTHER PUBLICATIONS

Andrew S. Tanenbaum, Structured Computer Organization, 1984, Prentice-Hall Inc., Second Edition, pp. 10-11.*

(Continued)

*Primary Examiner* — Elias Mamo
(74) *Attorney, Agent, or Firm* — Oblon, Spivak, McClelland, Maier & Neustadt, L.L.P.

(57) ABSTRACT

A portable terminal includes: a storage unit for storing at least a first program and software converting data to convert the first program into a second program; a storage control unit to perform reading and writing of the program and data as to the storage unit; a software converting processing unit to execute processing that converts the first program into the second program, using the first program and software converting data read by the storage control unit from the storage unit; and a terminal starting control unit to execute at the time of terminal startup one or the other of starting up the first program, and starting up the converting processing from the first program to the second program by the program converting processing unit and the second program that has been converted.

15 Claims, 18 Drawing Sheets

(56) References Cited

U.S. PATENT DOCUMENTS

| | | | |
|---|---|---|---|
| 2007/0220496 A1* | 9/2007 | Kasama | 717/136 |
| 2008/0052702 A1* | 2/2008 | Chuang | 717/170 |
| 2008/0148252 A1 | 6/2008 | Deng | |

FOREIGN PATENT DOCUMENTS

| | | |
|---|---|---|
| EP | 1 821 506 A2 | 8/2007 |
| JP | 4-60840 A | 2/1992 |
| JP | 7-93276 | 4/1995 |
| JP | 11-3229 A | 1/1999 |
| JP | 2000-35880 A | 2/2000 |
| JP | 2005-215841 A | 8/2005 |
| JP | 2006-31455 | 2/2006 |
| JP | 2006-164095 A | 6/2006 |
| WO | WO 2006/009287 A1 | 1/2006 |

OTHER PUBLICATIONS

Antonio Carlos S. Beck, et al. "Dynamic Reconfiguration with Binary Translation: Breaking the ILP Barrier with Software Compatibility", Design Automation Conference, Proceedings 42$^{nd}$ Anaheim, XP010837306, Jun. 13, 2005, pp. 732-737.

Cheng-Hsueh A. Hsieh, et al. "Java Bytecode to Native Code Translation: The Caffeine Prototype and Preliminary Results", XP010206088, vol. SYMP. 29, Dec. 2, 1996, pp. 90-97.

C. K. Cole, et al. "The Assembly-Language Translation of the Operational Flight Program for a Tactical Fighter Plane's Radar Data Processor", National Aerospace and Electronics Conference, XP000551060, vol. 2 of 02, May 22, 1995, pp. 923-929.

Richard C. Waters, "Program Translation via Abstraction and Reimplementation", I.E.E.E. Transactions on Software Engineering, vol. 14, No. 8, XP000051971, Aug. 1, 1988, pp. 1207-1228.

Robert A. Lawler, "Automatic Translation of Assembly Language Software", Proceedings of the National Aerospace and Electronics Conference, vol. 3, of 4, No. 1987, XP000012412, 1987, pp. 728-731.

Office Action issued May 2, 2012, in Chinese Patent Application No. 200910165882.6 with English translation.

\* cited by examiner

SDRAM MEMORY MAPPING
AT TIME OF CDMA STARTUP

NAND MEMORY MAPPING

EXPAND CDMA
PROGRAM REGION
WITHOUT CHANGE TO
SDRAM AND START

SDRAM MEMORY MAPPING
AT TIME OF GSM STARTUP

NAND MEMORY MAPPING

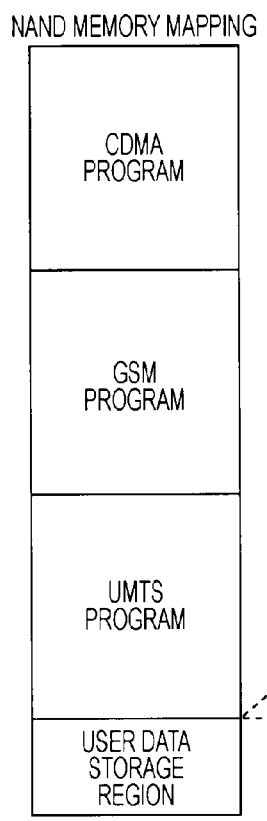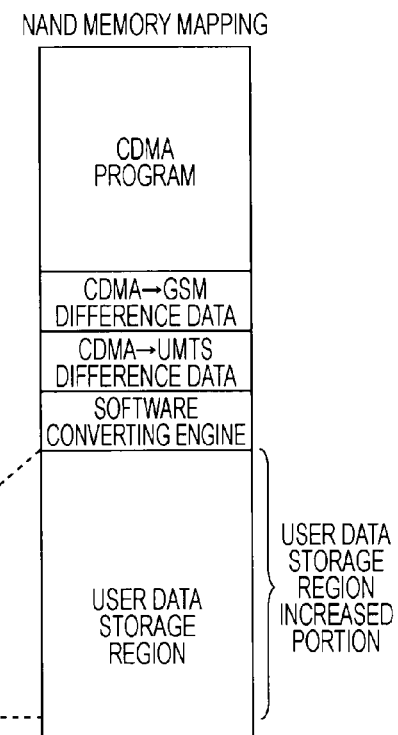
FIG. 10A
FIG. 10B

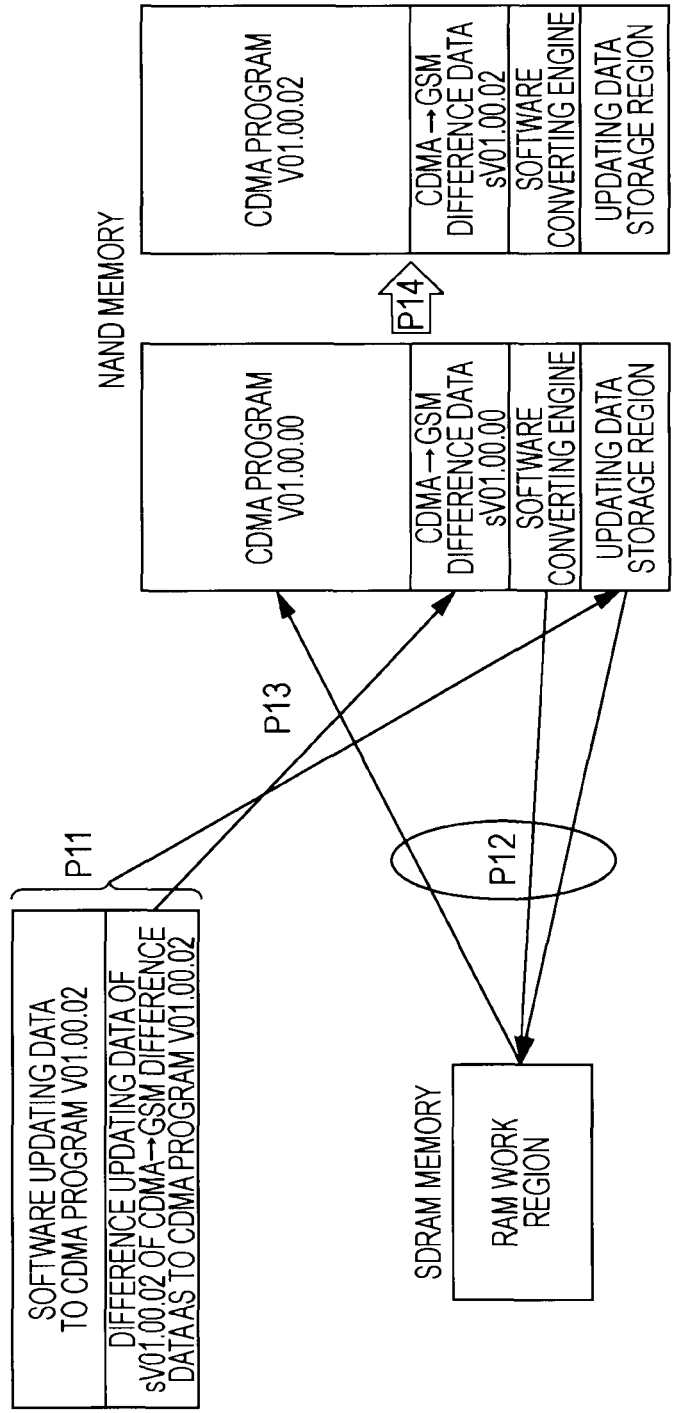

FIG. 15

SOFTWARE UPDATING DATA AT TIME OF UPDATING CDMA PROGRAM VERSION

|  |  | VERSION AFTER UPDATING | | |
|---|---|---|---|---|
|  |  | V01.00.00 | V01.00.01 | V01.00.02 |
| VERSION BEFORE UPDATING | V01.00.00 | × | ○ | ○ |
|  | V01.00.01 | × | × | ○ |
|  | V01.00.02 | × | × | × |

FIG. 16

DIFFERENCE UPDATING DATA OF CDMA→GSM DIFFERENCE DATA AT TIME OF UPDATING CDMA PROGRAM VERSION

|  |  | CDMA PROGRAM | | |
|---|---|---|---|---|
|  |  | V01.00.00 | V01.00.01 | V01.00.02 |
| CDMA→GSM DIFFERENCE DATA | V01.00.00 | ○ | × | × |
|  | V01.00.01 | × | ○ | × |
|  | V01.00.02 | × | × | ○ |

FIG. 17

SOFTWARE UPDATING DATA AT TIME OF UPDATING GSM PROGRAM VERSION

|  |  | VERSION AFTER UPDATING | | |
|---|---|---|---|---|
|  |  | V01.00.00 | V01.00.01 | V01.00.02 |
| VERSION BEFORE UPDATING | V01.00.00 | × | ○ | ○ |
|  | V01.00.01 | × | × | ○ |
|  | V01.00.02 | × | × | × |

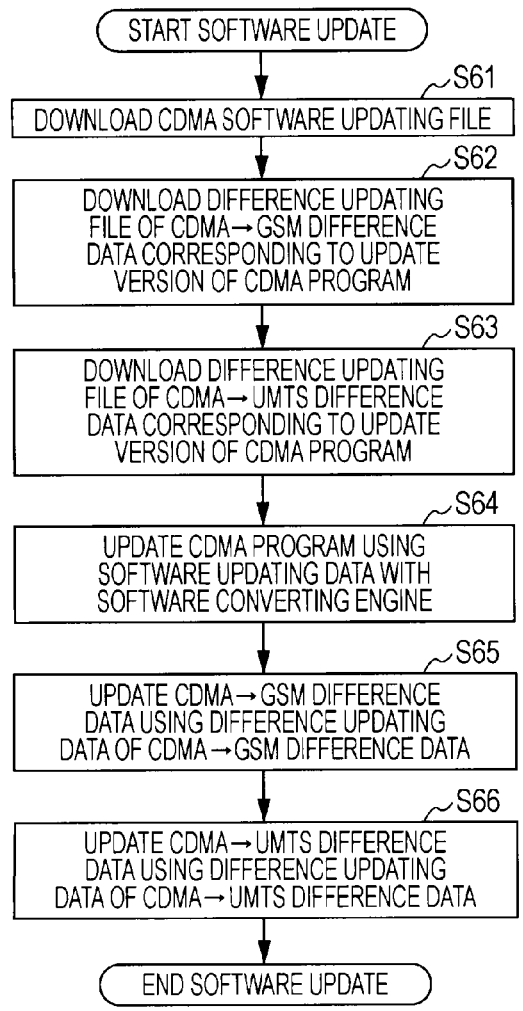

PORTABLE TERMINAL, PORTABLE TERMINAL CONTROL METHOD, AND PORTABLE TERMINAL CONTROL PROGRAM

BACKGROUND OF THE INVENTION

1. Field of the Invention

The present invention relates to a portable terminal, portable terminal control method, and portable terminal control program that can be started up by appropriately switching between multiple different programs.

2. Description of the Related Art

Recently, portable terminals that perform wireless communication by appropriately switching between two different communication methods such as a CDMA (Code Division Multiple Access) communication method and a GSM (Global Systems for Mobile) communication method, for example, have been sold as products.

The most simple method to realize the type of communication switching herein may be a method to prepare a program wherein a CDMA communication method and GSM communication method wireless communication processes can each be independently executed, and these programs are switched as appropriate and started (booted) up. Note that in the description below, a program executing wireless communication processing of the CDMA communication method will be referred to as "CDMA program", and a program executing wireless communication processing of the GSM communication method will be referred to as "GSM program".

That is to say, in the case of the portable communication terminal herein, for example as shown in FIG. 25, the NAND memory and so forth within the terminal has a CDMA program and a GSM program each independently prepared. At the time of booting up the portable communication terminal, the program selected beforehand by a user or the like is read from the NAND memory, loaded to a work region such as a SDRAM (Synchronous DRAM) and executed. Thus, with a portable communication terminal, wireless communication can be made with the desired communication method of either a CDMA communication method or a GSM communication method.

Also, with a portable communication terminal that handles dual-boot to switch between the CDMA program and GSM program an start as described above, for example in the case that the CDMA program or GSM program is updated, each program is individually updated. For example, in the case that we assume the version of a CDMA program and GSM program changes from version "V01.00.00" at the time of shipping to "V01.00.01", and further a newer version "V01.00.02" is released, program updates are individually performed at the portable communication terminal in the order that each version is released, as shown in FIG. 26.

Also, Japanese Unexamined Patent Application Publication No. 7-93276 discloses a technique whereby, in the case there is a difference file of a before-updating program file and an after-updating program file, a program after updating is generated by combining the before-updating program and the difference file and loading this to memory, thereby executing processing to start up the computer with the after-updating program. Note that the before-updating program and after-updating program disclosed in Japanese Unexamined Patent Application Publication No. 7-93276 may be the same program that differs only by new/old versions, and accordingly the difference file is difference data to update the old version program to the new version.

SUMMARY OF THE INVENTION

Now, as described above, in the case of a portable communication terminal that handles dual-boot, both a CDMA program and a GSM program are stored in the internal NAND memory or the like, as shown in FIG. 25. Therefore, a portable communication terminal that handles dual-boot takes more memory capacity as compared to a terminal with only one boot program for example, whereby there is a disadvantage that the memory capacity for other data (e.g. user data storage region and so forth) is significantly reduced.

Further, with a portable communication terminal that handles dual-boot, for example in the case that updating the CDMA program and GSM program has to be performed, work to update both programs individually has to be performed, as shown in FIG. 26. Accordingly, in the case of a portable communication terminal that handles dual-boot, version managing for each of the program of the CDMA program and GSM program has to be performed. That is to say, in the case of a portable communication terminal that handles dual-boot, there is the disadvantage that version managing for the various programs can readily become complicated.

There has been realized demand to provide a portable terminal, portable terminal control method, and portable terminal control program, which enable efficient use of memory capacity and ease of version managing at the time of software updating.

According to an embodiment of the present invention, a storage unit stores at least a first program, and software converting data for converting the first program into a second program. Also, according to an embodiment of the present invention, processing to convert the first program into the second program can be executed by using the first program and the software converting data for converting the first program into the second program. Also, according to an embodiment of the present invention, one of either the startup of the first program, or the conversion processing from the first program to the second program and the startup of the second program generated with the conversion thereof, is executed according to a predetermined startup setting value.

Also, according to an embodiment of the present invention, at the time of updating the first program, software updating data to update the old version first program into the new version first program, and software converting data corresponding to the new version of the first program, are obtained. Further, the obtained software updating data is used to update the old version first program into the new version first program. The after-updating first program and the obtained software converting data are stored in a storage unit.

That is to say, according to an embodiment of the present invention, the first program and the software converting data are stored in the storage unit, and the second program is not stored therein.

Also, according to an embodiment of the present invention, at the time that the first program should be started up the first program in the storage unit is started, and at the time that the second program should be started up the second program is generated from the first program and software converting data and started up.

Further, according to an embodiment of the present invention, at the time of updating the first program, the software updating data may be obtained and the program updated, with the software converting data in the storage unit being overwritten with the software converting data corresponding to the new version obtained at the same time as the software updating data.

According to the above configurations, the first program and software converting data are stored in the storage unit, and the second program is not stored therein, whereby memory capacity does not have to be used for storing the second program, and memory capacity can be efficiently used.

Also according to the above configurations, at the time that the first program should be started up the first program in the storage unit is started, and at the time that the second program should be started up the second program is generated and started up from the first program and software converting data, whereby at least dual-boot is enabled.

Further, according to the above configurations, at the same time as updating the first program, the software converting data is overwritten by the software converting data corresponding to the version of the first program after updating, whereby version managing at the time of updating can be readily performed.

BRIEF DESCRIPTION OF THE DRAWINGS

FIGS. 10A and 10B are diagrams illustrating a memory mapping example in the case that a CDMA program and CDMA→GSM difference data and CDMA→UMTS difference data are stored in the NAND memory, and in the case that programs for each of CDMA, GSM, and UMTS are stored as comparison examples thereto;

FIG. 14 is a diagram describing the processing sequence at the time of updating the CDMA program and the CDMA→GSM difference data, at a cellular telephone terminal that handles dual-boot;

FIG. 15 is a diagram describing content to be managed at the time of updating the CDMA program version according to the present embodiment;

FIG. 16 is a diagram describing content to be managed at the time of updating the version of the CDMA→GSM difference data according to the present embodiment;

FIG. 17 is a diagram describing the content to be managed at the time of updating the GSM program version in particular, in the case that both a CDMA program and a GSM program are stored in the NAND memory, as a comparison example of the present embodiment;

FIG. 23 is a diagram describing content to be managed at the time of updating the version of the CDMA→UMTS difference data according to the present embodiment;

FIG. 24 is a flowchart describing the flow of updating processing executed with a modem processing at a cellular telephone terminal that handles multi-boot according to the present embodiment;

DESCRIPTION OF THE PREFERRED EMBODIMENTS

An embodiment according to the present invention will be described below with reference to the diagrams. Note that with the embodiments described below, a cellular telephone terminal is given as an application example of a portable terminal of the present invention, but the content described in the present embodiment is only an example, and it goes without saying that the present invention is not limited to this example.

First, as an embodiment of the present invention, a cellular telephone terminal that handles dual-boot which can be started (booted) up with one of a CDMA program executing wireless communication processing of a CDMA communication method and a GSM program executing wireless communication processing of a GSM communication method will be described.

Schematic Configuration of Cellular Telephone Terminal of Present Embodiment

Figure 1:
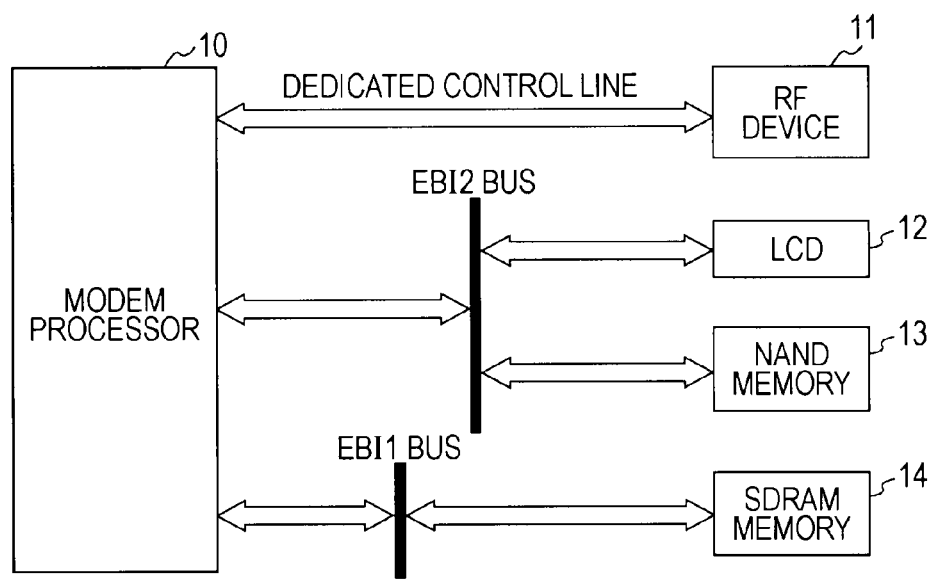
FIG. 1 is a block diagram illustrating a schematic example of an internal configuration of a cellular telephone terminal according to an embodiment of the present invention.

FIG. 1 is a schematic internal block configuration example of a cellular telephone terminal according to an embodiment of the present invention. In FIG. 1, a cellular telephone terminal according to the present embodiment, according to selection beforehand by a user, can be started up at the time of booting with one of a CDMA program to execute various types of signal processing relating to communication by a CDMA air interface, and a GSM program to execute various types of signal processing relating to communication by a GSM air interface. That is to say, a modem processor 10 of the cellular telephone terminal of the present embodiment can execute a started up program, which is one of the CDMA program or the GSM program. That is to say, the cellular telephone terminal of the present embodiment is a terminal that is dual-boot capable. Note that the modem processor 10 also performs control of various portions in the cellular telephone terminal of the present embodiment and various types of signal processing, and control of writing and reading of NAND memory 13 and SDRAM memory 14, and so forth. The details of the operations of the cellular telephone terminal of the present embodiment at the time of starting up the CDMA program or GSM program will be described later.

An RF device 11 is made up of an antenna to perform wireless communication between cellular telephone base stations and various types of circuit portions to perform signal modulation/demodulation and so forth. The RF device 11 is connected to the modem processor 10 via a dedicated control line. Data exchange of sending/receiving data between the RF device 11 and modem processor 10, and control of the RF device 11 by the modem processor 10, are performed via the dedicated control line.

A LCD (Liquid Crystal Display) unit 12 is a user interface device by displaying, which is provided on the cellular telephone terminal, and is made up of a liquid crystal display and a circuit driving the liquid crystal display. Note that a liquid crystal display is exemplified in the present embodiment, but another display such as an organic EL (Electro Luminescent) or FED (Field Emission Display) for example may be used. The LCD unit 12 is connected to the modem processor 10 via an EBI (External Bus Interface) 1 bus. Data exchange between the LCD unit 12 and modem processor 10, and control of the LCD unit 12 by the modem processor 10, are performed via the EBI 1 bus.

NAND memory 13 is non-volatile memory that stores various types of programs for the modem processor 10 to control various types of signal processing such as communication and various units after terminal startup, and other various types of data such as various types of initialization setting values, user data, and so forth. The NAND memory 13 is connected to the modem processor 10 via the EBI 1 bus. Data exchange between the NAND memory 13 and the modem processor 10, and control of the NAND memory 13 by the modem processor 10, are performed via the EBI 1 bus.

Also, in the case of the present embodiment, a boot control program executing control relating to dual-boot with the cellular telephone terminal and an update control program to execute control relating to software updates are also stored in the NAND memory 13.

Further, in the case of the present embodiment, only one program of either a CDMA program or a GSM program for example, and software converting data to convert the one program into the other program as well as a software converting engine program are stored in the NAND memory 13. Note that the CDMA program and GSM program are each programs formed by multiple program components described by predetermined software languages and so forth being combined.

Now, in the case that the one program stored in the NAND memory 13 is the CDMA program, the software converting data identifies the program components in the CDMA program that are different from the GSM program, while converting (e.g. replacing) the program components identified in the CDMA program into program components for the GSM program. In other words, the software converting data in this case is difference data between the CDMA program and GSM program. In the descriptions below, the software converting data to convert the CDMA program into the GSM program is simplified and written as "CDMA→GSM difference data".

Also, in the case that the CDMA program is stored in the NAND memory 13 as described above, the software converting engine program is a program to execute processing to convert the CDMA program into the GSM program using the CDMA→GSM difference data. In the descriptions below, the software converting engine program is simplified and written as "software converting engine".

On the other hand, in the case that the one program stored in the NAND memory 13 is the GSM program, the software converting data identifies the program components in the GSM program that are different from the CDMA program, while converting (e.g. replace) the program components identified in the GSM program into program components for the CDMA program. In other words, the software converting data in this case is difference data between the GSM program and CDMA program. In the descriptions below, the software converting data to convert the GSM program into the CDMA program is simplified and written as "GSM→CDMA difference data".

Also, in the case that the GSM program is thus stored in the NAND memory 13, the software converting engine is a program to execute processing to convert the GSM program into the CDMA program using the GSM→CDMA difference data.

The SDRAM memory 14 has a program region wherein a program that is executed by the modem processor 10 or the like is loaded, and a RAM work region for storing the data occasionally as a work region of the modem processor 10, and a buffer region to temporarily accumulate various types of data such as sending/receiving data. The SDRAM memory 14 is connected to the modem processor 10 via the EBI 2 bus. Data exchange between the SDRAM memory 14 and the modem processor 10, and control of the SDRAM memory 14 by the modem processor 10, are performed via the EBI 2 bus.

Note that in the description below, with a cellular telephone terminal of the present embodiment, an operation mode in the case that the CDMA program is started up at the time of booting is called "CDMA mode", and an operation mode in the case that the GSM program is started up at the time of booting is called "GSM mode".

Memory Mapping on NAND Memory

Figure 2A:
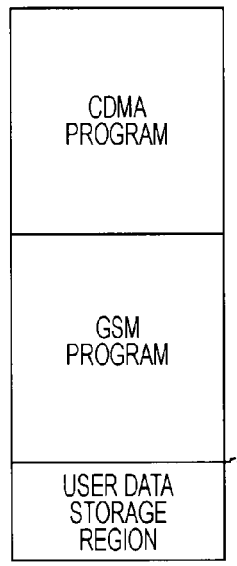
FIGS. 2A and 2B are diagrams illustrating a memory mapping example in the case that CDMA program and CDMA→GSM difference data is stored in the NAND memory, and a case that both CDMA and GSM programs are stored as comparison examples thereto.
Figure 2B:
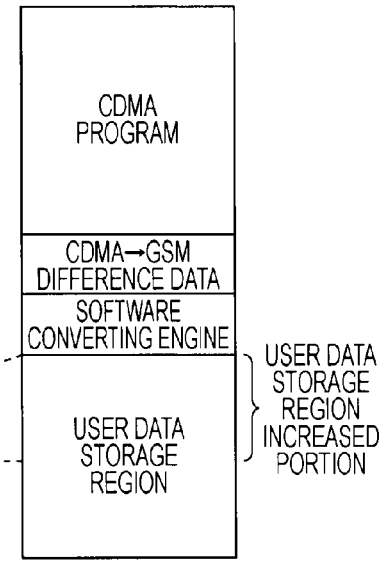

FIG. 2B shows a memory mapping example in the case that a CDMA program, CDMA→GSM difference data, and a software converting engine are stored in the NAND memory 13. Note that in FIG. 2B, only the CDMA program, CDMA→GSM difference data, software converting engine, and a user data storage region are shown, and other programs and data are omitted from the diagram.

Also, FIG. 2A shows a memory mapping example in the case that the CDMA program and GSM program are both independently stored on the NAND memory, as a comparison example as to the memory mapping of the present embodiment as shown in FIG. 2B.

As we can see from FIG. 2B, in the case that the CDMA program, CDMA→GSM difference data, and software converting engine are stored as in the present embodiment, a larger user data storage region can be secured as compared to FIG. 2A. That is to say, compared to the data amount of the CDMA program and GSM program, the data amount of the CDMA→GSM difference data and software converting engine is far less. Therefore, in the case of FIG. 2B, the user data storage region is increased by an amount equivalent to the data amount of the CDMA→GSM difference data and software converting engine subtracted from the data amount of the GSM program in FIG. 2A.

Figure 3A:
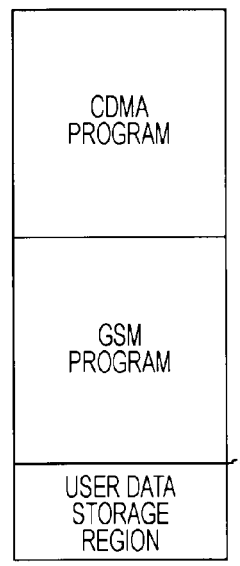
FIGS. 3A and 3B are diagrams illustrating a memory mapping example in the case that GSM program and GSM→CDMA difference data is stored in the NAND memory, and a case that both CDMA and GSM programs are stored as comparison examples thereto.
Figure 3B:
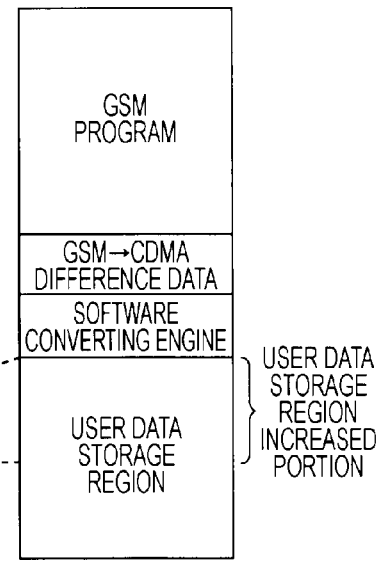

On the other hand, FIG. 3B shows memory mapping in the case that a GSM program, GSM→CDMA difference data, software converting engine, and user data storage region are stored in the NAND memory 13. Note that FIG. 3A shows the memory mapping example of the NAND memory similar to that in FIG. 2A. The example in FIGS. 3A and 3B is similar to the case in FIGS. 2A and 2B, and in the case of FIG. 3B, the user data storage region is increased by an amount equivalent to the data amount of the GSM→CDMA difference data and software converting engine subtracted from the data amount of the CDMA program in FIG. 3A.

In the case of the present embodiment as described, only one program of a CDMA program and GSM program is stored in the NAND memory 13. Also, the difference data stored in the NAND memory 13 is only the CDMA→GSM difference data in the case that the CDMA program is stored, and on the other hand in the case that the GSM program is stored, the difference data is only the GSM→CDMA difference data. Accordingly, according to the present embodiment, a larger user data storage region and so forth can be secured as compared to the case that both the CDMA program and the GSM program are stored. Specifically, as compared to the case that both the CDMA program and the GSM program are stored, in the case of the present embodiment, a larger memory capacity can be secured in several megabyte increments, and the memory capacity thereof can be added to the user data storage region and so forth.

Note that with the present embodiment, which of the CDMA program and GSM program to be stored in the NAND memory 13 is determined by considering the usage frequency of the programs thereof. For example, in the case that the CDMA communication method is used in the geographical region that the user primarily uses the device, the CDMA program is stored in the NAND memory 13, and in the case that the GSM communication method is primarily used, the GSM program is stored.

Operations at the Time of Booting of Terminal Handling Dual-Boot

The cellular telephone terminal of the present embodiment performs the startup processing as described below by for example the modem processor 10 executing a boot control program stored in the NAND memory 13 at the time of startup. First, the startup processing in the case that the CDMA program, CDMA→GSM difference data, and software converting engine are stored in the NAND memory 13, in the case that startup with CDMA mode has been selected beforehand by the user, will be described with reference to FIGS. 4A and 4B.

Figure 4A:
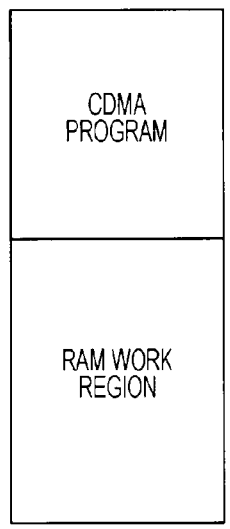
FIGS. 4A and 4B are diagrams describing startup processing in the case of startup in CDMA mode, in the case that a CDMA program and CDMA→GSM difference data are stored in the NAND memory.
Figure 4B:
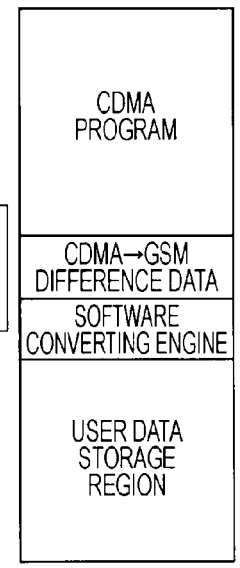

FIGS. 4A and 4B show a state wherein the modem processor 10 loads the CDMA program from the NAND memory 13 to the program region of the SDRAM memory 14 at the time of booting, in the case that the CDMA program is stored in the NAND memory 13 and startup in CDMA mode has been selected beforehand. Note that FIG. 4A illustrates the memory mapping of the SDRAM memory 14, and FIG. 4B illustrates the memory mapping of the NAND memory 13. However, similar to the example in FIG. 2B described above, FIG. 4B shows only the CDMA program, CDMA→GSM difference data, software converting engine, and user data storage region, and other programs and data and so forth are omitted from the diagram. Also, FIG. 4A illustrates only the program region and RAM work region, and the other regions such as a buffer region are omitted from the diagram.

That is to say, in the case that the CDMA program or the like is stored in the NAND memory 13 and that startup in CDMA mode is selected beforehand by a user, the modem processor 10 during boot control program executing loads the CDMA program in the NAND memory 13 to the program region of the SDRAM memory 14 without change, and starts the program, as shown in FIGS. 4A and 4B. The cellular telephone terminal of the present embodiment is thus started in CDMA mode.

Next, starting processing in the case that the CDMA program, CDMA→GSM difference data, and software converting engine are stored in the NAND memory 13, in the case that startup in GSM mode has been selected beforehand by the user, will be described with reference to FIGS. 5A and 5B.

Figure 5A:
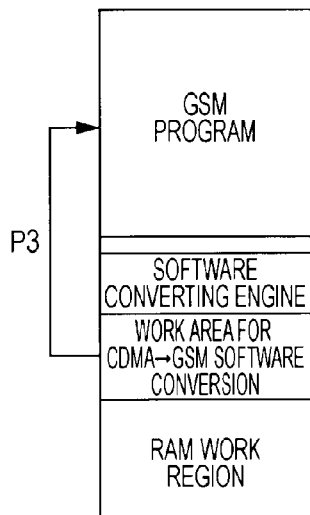
FIGS. 5A and 5B are diagrams describing startup processing in the case of startup in GSM mode, in the case that a CDMA program and CDMA→GSM difference data are stored in the NAND memory.
Figure 5B:
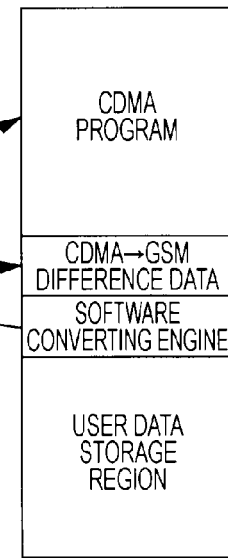

FIGS. 5A and 5B show a state of loading the program which the modem processor 10 executes at the time of booting, and data transferring processing, in the case that the CDMA program or the like is stored in the NAND memory and that startup in GSM mode is selected beforehand. Note that FIG. 5A illustrates memory mapping of the SDRAM memory 14, and FIG. 5B illustrates memory mapping of the NAND memory 13. However, similar to the example in FIG. 4B described above, FIG. 5B shows only the CDMA program, CDMA→GSM difference data, software converting engine, and user data storage region, and other programs, data, and so forth are omitted from the diagram. Also, FIG. 5B shows only the program region and RAM work region, and the buffer region and so forth are omitted from the diagram.

That is to say, in the case that the CDMA program or the like is stored in the NAND memory 13 and that startup in GSM mode is selected beforehand by the user, the modem processor 10 during executing the boot control program loads (P1) the software converting engine of the NAND memory 13 to the RAM work region of the SDRAM memory 14 and starts the program. Note that the RAM work region is the storage region for variables and so forth defined in a program after the program has started up, but at this point in time is still during booting, so use of the entire region of the RAM work region is enabled.

Next, the modem processor 10 during executing the software converting engine uses the software converting work region that is separately formed within the RAM work region of the SDRAM memory 14 to create (P2) the GSM program from the CDMA program and the CDMA→GSM difference data in the NAND memory 13.

Also, the modem processor 10 during executing the software converting engine sequentially transfers and loads (P3) the GSM program created in the software converting work region to a program region in the SDRAM memory 14. Note that the converting processing of the program at this time is performed in increments of regulated blocks, whereby data transfer is performed in block increments at the time of loading to the program region.

Upon ending loading the entire GSM program to the program region of the SDRAM memory 14, the mode processor 10 starts up the GSM program. Thus, the cellular telephone terminals of the present embodiment can be started up in GSM mode.

Note that in the case that loading the entire GSM program to the program region of the SDRAM memory 14 has ended, it is desirable for the software converting engine on the RAM work region of the SDRAM memory 14 and the data in the software converting work region to be erased, and a region that is usable on the RAM work region to be secured.

On the other hand, in the case that the GSM program, GSM→CDMA difference data, and software converting engine are stored in the NAND memory 13, the cellular telephone terminal performs startup processing at the time of booting such as shown in FIGS. 6 and 7.

Figure 6A:
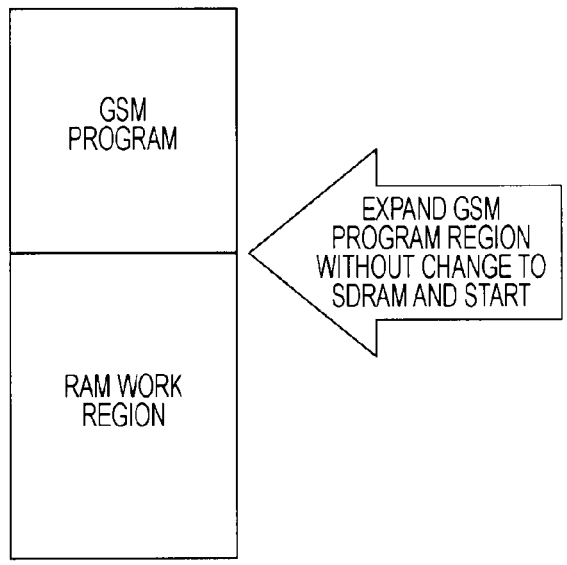
FIGS. 6A and 6B are diagrams describing startup processing in the case of startup in GSM mode, in the case that a GSM program and GSM→CDMA difference data are stored in the NAND memory.
Figure 6B:
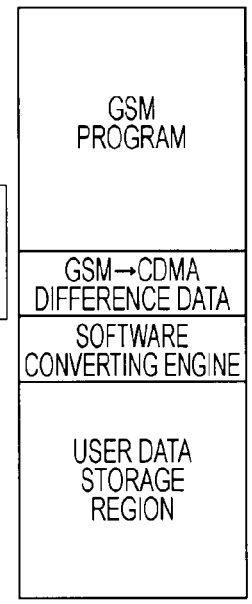

FIGS. 6A and 6B show a state of startup processing at the time that the GSM program, the GSM→CDMA difference data, and software converting engine are stored in the NAND memory 13, and the startup in GSM mode has been selected beforehand by the user. Note that FIG. 6A illustrates memory mapping of the SDRAM memory 14, and FIG. 6B illustrates the memory mapping of the NAND memory 13. However, similar to the example in FIGS. 3A and 3B described above, FIG. 6B shows only the GSM program, GSM→CDMA difference data, software converting engine, and user data storage region, and other programs, data, and so forth are omitted from the diagram. Also, FIG. 6A shows only the program region and RAM work region, and the buffer region and so forth are omitted from the diagram.

That is to say, as shown in FIGS. 6A and 6B, in the case that the GSM program or the like is stored in the NAND memory 13 and startup in GSM mode has been selected beforehand by the user, the modem processor 10 during executing of the boot control program loads the GSM program in the NAND memory 13 to the program region of the SDRAM memory 14 without change, and starts the program. Thus, the cellular telephone terminals of the present embodiment can be started up in GSM mode.

Figure 7A:
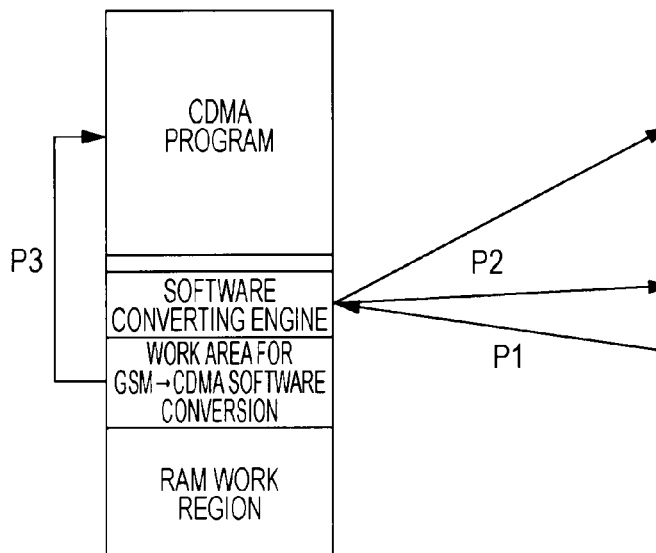
FIGS. 7A and 7B are diagrams describing startup processing in the case of startup in CDMA mode, in the case that a GSM program and GSM→CDMA difference data are stored in the NAND memory.
Figure 7B:
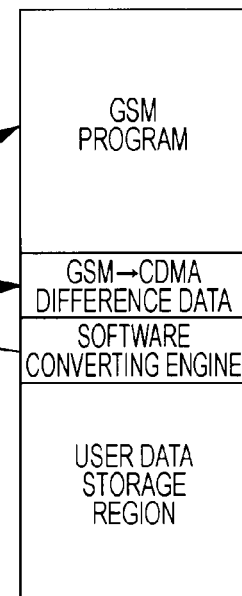

Conversely, in the case that the GSM program or the like is stored in the NAND memory 13 and that startup in CDMA mode is selected beforehand by the user, startup processing such as shown in FIGS. 7A and 7B is performed at the time of booting of the cellular telephone terminal of the present embodiment.

FIGS. 7A and 7B show a state of loading the program that the modem processor 10 executes at the time of booting up and data transfer processing, in the case that the GSM program or the like is stored in the NAND memory 13 and that startup in CDMA mode has been selected beforehand by the user. Note that FIG. 7A illustrates memory mapping of the SDRAM memory 14, and FIG. 7B illustrates memory mapping of the NAND memory 13. However, similar to the example in FIG. 6B described above, FIG. 7B shows only the GSM program, GSM→CDMA difference data, software converting engine, and user data storage region, and other programs, data, and so forth are omitted from the diagram. Also, FIG. 7A shows only the program region and RAM work region, and the buffer region and so forth are omitted from the diagram.

That is to say, in the case that the GSM program or the like is stored in the NAND memory 13 and startup in CDMA mode has been selected beforehand by the user, the modem processor 10 during executing of the boot control program first loads (P1) the software converting engine in the NAND memory 13 to the RAM work region of the SDRAM memory 14, and starts the program. Thus, the RAM work region at this point in time may have the entire region usable, similar to that described above.

Next, the modem processor 10 during executing the software converting engine uses the software converting work region that is separately formed within the RAM work region of the SDRAM memory 14 to create (P2) the CDMA program from the GSM program and the GSM→CDMA difference data in the NAND memory 13.

Also, the modem processor 10 during executing the software converting engine sequentially transfers and loads (P3) the CDMA program created in the software converting work region to a program region in the SDRAM memory 14. Note that the transfer in this example also is performed in increments of blocks, similar to that described above.

Upon ending loading the entire CDMA program to the program region of the SDRAM memory 14, the modem processor 10 starts up the CDMA program. Thus, the cellular telephone terminal of the present embodiment can be started up in CDMA mode.

Note that in the case that loading the entire CDMA program to the program region of the SDRAM memory 14 has ended, it is desirable for the software converting engine on the RAM work region of the SDRAM memory 14 and the data in the software converting work region to be erased, and a region that is usable on the RAM work region to be secured.

Flowchart of Operations at the Time of Booting in Terminal Handling Dual-Boot

Figure 8:
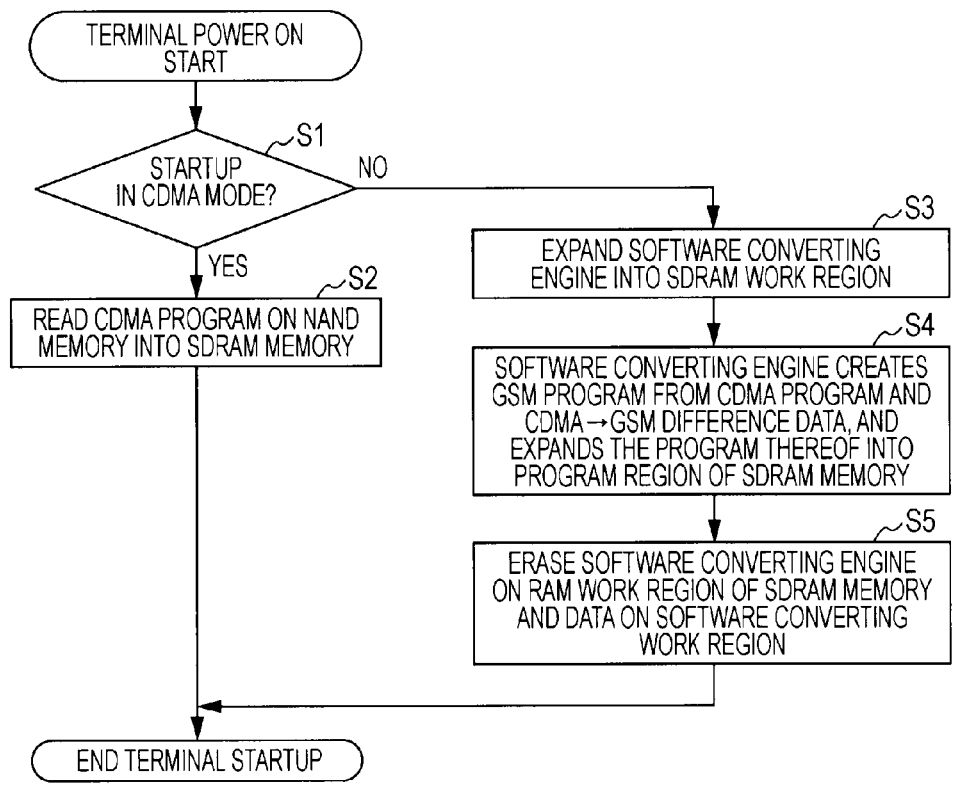
FIG. 8 is a flowchart describing the flow of processing executed with a modem processor at the time of booting, in the case that a CDMA program or the like is stored in the NAND memory of a cellular telephone terminal that handles dual-boot.

FIG. 8 describes the flow of processing executed with the modem processor 10 at the time of booting, in the case that the CDMA program or the like is stored in the NAND memory 13. In FIG. 8, upon the startup processing being started by turning the power ON of the cellular telephone terminal or the like, the modem processor 10 first references a user setting value saved in the NAND memory 13 by executing the boot control program. The user setting value is a value that the user sets by selecting beforehand which of the CDMA mode and GSM mode to start up with as described above, and is a value managed by flag information or the like on a non-volatile memory such as the NAND memory 13, for example.

The modem processor 10 determines whether or not the user setting value expressing the operating mode at the time of booting is the value indicating CDMA mode, as processing in step S1. In the determining processing in step S1 the mode processor 10 advances the processing to step S2 in the case of determining that the CDMA mode is set, and on the other hand, advances the processing to step S3 in the case of determining that the GSM mode is set.

Upon advancing the processing to Step S2, the modem processor 10 loads the CDMA program on the NAND memory 13 to the program region of the SDRAM memory 14 without change.

The modem processor 10 then starts up the CDMA program that has been loaded to the program region of the SDRAM memory 14. Thus, the cellular telephone terminal of the present embodiment can be started up in CDMA mode.

On the other hand, upon advancing to the processing in step S3, the modem processor 10 loads the software converting engine of the NAND memory 13 to the RAM work region of the SDRAM memory 14 and starts up the software converting engine.

Upon the expansion and startup of the software converting engine in step S3 ending, the modem processor 10 switches to executing the processing by the software converting engine, and advances the processing to step S4.

Upon advancing to the processing in step S4, the modem processor 10 uses the software converting work region that is separately formed within the RAM work region of the SDRAM memory 14 to create the GSM program from the CDMA program and the CDMA→GSM difference data in the NAND memory 13. Also, the modem processor 10 sequentially transfers and loads the GSM program created in the software converting work region to a program region in the SDRAM memory 14.

Upon ending loading the entire GSM program to the program region of the SDRAM memory 14, the modem processor 10 erases the software converting engine on the RAM work region of the SDRAM memory 14 and the data in the software converting work region as the processing in step S5.

Subsequently, the modem processor 10 starts up the GSM program that has been loaded to the program region of the SDRAM memory 14. Thus, the cellular telephone terminal of the present embodiment is started up in GSM mode. Note that the data erasing processing in step S5 may be performed after starting up the GSM program.

Figure 9:
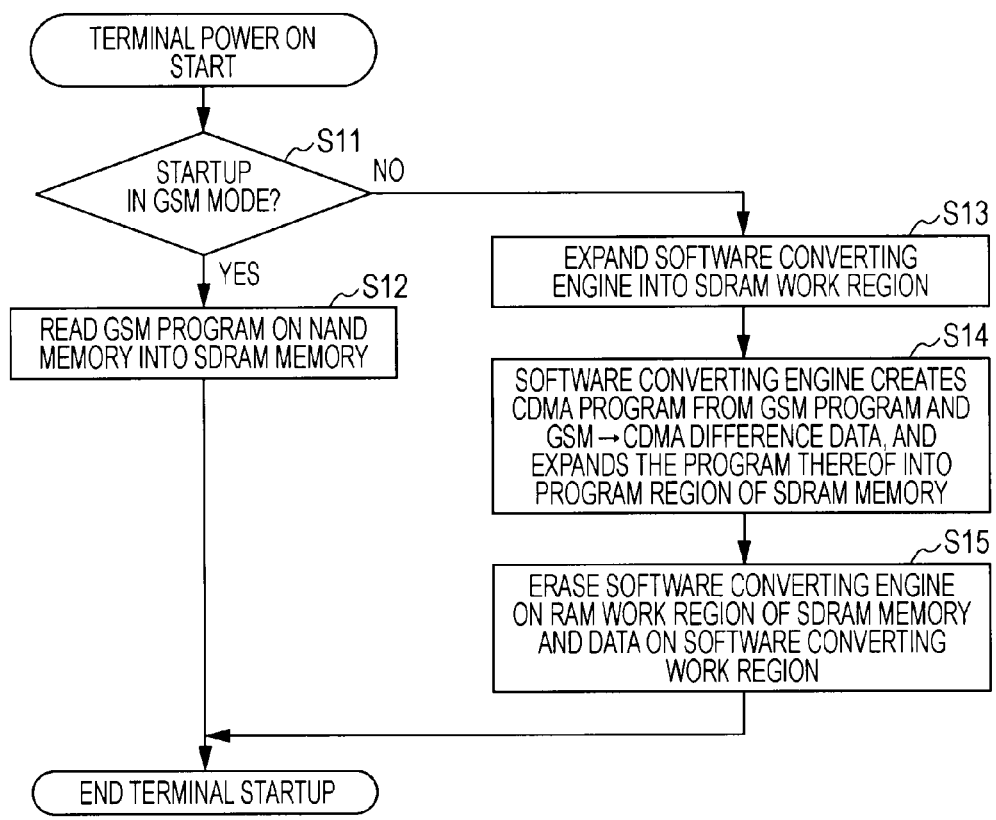
FIG. 9 is a flowchart describing the flow of processing executed with a modem processor at the time of booting, in the case that a CDMA program or the like is stored in the NAND memory of a cellular telephone terminal that handles dual-boot.

FIG. 9 describes the flow of processing executed with the modem processor 10 at the time of booting, in the case that the CDMA program or the like is stored in the NAND memory 13. In FIG. 9, upon the startup processing being started by turning the power ON of the cellular telephone terminal or the like, the modem processor 10 references a user setting value saved in the NAND memory 13, and in the processing in step S11, determines whether or not the user setting value expressing the operating mode at the time of booting is set to the value showing GSM mode. In the case that in the determining processing in step S11 the modem processor 10 determines that GSM mode is set, the processing is advanced to step S12, and on the other hand in the case of determining that the CDMA mode is set, the processing is advanced to step S13.

Upon advancing to the processing in step S12, the modem processor 10 loads the GSM program on the NAND memory 13 to the program region of the SDRAM memory 14 without change, and starts up the GSM program thereof. Thus, the cellular telephone terminal of the present embodiment is started up in GSM mode.

On the other hand, upon advancing to the processing in step S13, the modem processor 10 loads the software converting engine of the NAND memory 13 to the RAM work region of the SDRAM memory 14 and starts up the software converting engine, and the processing is advanced to step S14.

Upon advancing to the processing in step S14, the modem processor 10 uses the software converting work region of the SDRAM memory 14 to create the CDMA program from the GSM program and the GSM→CDMA difference data in the NAND memory 13. Also, the modem processor 10 sequentially transfers and loads the CDMA program created in the software converting work region to a program region in the SDRAM memory 14.

Upon ending loading the entire CDMA program to the program region of the SDRAM memory 14, the modem processor 10 erases the software converting engine on the RAM work region of the SDRAM memory 14 and the data in the software converting work region, as processing of step S15.

Subsequently, the modem processor 10 starts up the CDMA program loaded to the program region of the SDRAM memory 14. Thus, the cellular telephone terminal of the present embodiment is started up in CDMA mode. Note that the data erasing processing in step S15 may be performed after starting up the CDMA program.

Embodiment of Multi-Boot

According to the above-described embodiments, examples of dual-boot are described which start up with either a CDMA program or GSM program, but the present invention can be applied to multi-boot which starts up with one of three or more programs.

An example of multi-boot will be described below which starts up with one of three programs of the CDMA program, GSM program, and further a program that executes wireless communication processing with a UMTS (Universal Mobile Telecommunications System) communication method (hereafter called "UMTS program").

In the case of realizing multi-boot that starts up with one of the above three programs as with the present embodiment, one program of the three programs, software converting data to convert the one program into each of the other programs, and a software converting engine, are stored in the NAND memory 13.

In the case that the one program stored in the NAND memory 13 is the CDMA program, the software converting data is made up of two types of data which are the CDMA→GSM difference data and data to convert the CDMA program into a UMTS program. Note that the data to convert the CDMA program into a UMTS program identifies the program components in the CDMA program that are different from the UMTS program, while converting (e.g. replacing) the program components identified in the CDMA program into program components for the UMTS program. In other words, the software converting data in this case is difference data between the CDMA program and UMTS program. In the descriptions below, the software converting data to convert the CDMA program into the UMTS program is simplified and written as "CDMA→UMTS difference data".

Also, in the case of realizing multi-boot to start up with one of the three programs, when the CDMA program is stored in the NAND memory 13, the software converting engine realizes a function to convert the CDMA program into a UMTS program, in addition to a function to convert the CDMA program into the GSM program as described above. That is to say, the function to convert the CDMA program into a UMTS program is realized by the modem processor 10 using the CDMA→UMTS difference data to execute processing that converts the CDMA program into a UMTS program.

On the other hand, in the case of realizing multi-boot to start up with one of the three programs, when the one program stored in the NAND memory 13 is the GSM program, the software converting data is made up of two types of data which are the GSM→CDMA difference data and data to convert the GSM program into a UMTS program. That is to say, the data to convert the GSM program into a UMTS program identifies the program components in the GSM program that are different from the UMTS program, while converting the program components identified in the GSM program into program components for the UMTS program. In other words, the software converting data in this case is difference data between the GSM program and the UMTS program. In the descriptions below, the software converting data to convert the GSM program into the UMTS program is simplified and written as "GSM→UMTS difference data".

Also, in the case of realizing multi-boot to start up with one of the three programs, when the GSM program is stored in the NAND memory 13, the software converting engine realizes a function to convert the GSM program into a UMTS program, in addition to a function to convert the GSM program into the CDMA program as described above. That is to say, the function to convert the GSM program into a UMTS program is realized by the modem processor 10 using the GSM→UMTS difference data to execute processing that converts the GSM program into a UMTS program.

On the other hand, in the case of realizing multi-boot to start up with one of the three programs, when the one program stored in the NAND memory 13 is the UMTS program, the software converting data is made up of two types of data which are the data to convert the UMTS program into the CDMA program and data to convert the UMTS program into the GSM program.

That is to say, the data to convert the UMTS program into a CDMA program identifies the program components in the UMTS program that are different from the CDMA program, while converting (e.g. replacing) the program components identified in the UMTS program into program components for the CDMA program. In other words, the software converting data in this case is difference data between the UMTS program and CDMA program. In the descriptions below, the software converting data to convert the UMTS program into the CDMA program is simplified and written as "UMTS→CDMA difference data".

Similarly, the data to convert the UMTS program into a GSM program identifies the program components in the UMTS program that are different from the GSM program, while converting (e.g. replacing) the program components identified in the UMTS program into program components for the GSM program. In other words, the software converting data in this case is difference data between the UMTS program and GSM program. In the descriptions below, the software converting data to convert the UMTS program into the GSM program is simplified and written as "UMTS→GSM difference data".

On the other hand, in the case of realizing multi-boot to start up with one of the three programs, when the UMTS program is stored in the NAND memory 13, the software converting engine has a function to convert the UMTS program into the CDMA program, and a function to convert the UMTS program into the GSM program.

That is to say, the function to convert the UMTS program into the CDMA program is a program wherein the modem processor 10 executes processing to convert the UMTS program into CDMA program using the UMTS→CDMA difference data. Also, the function to convert the UMTS program into the GSM program is a program wherein the modem processor 10 executes processing to convert the UMTS program into GSM program using the UMTS→GSM difference data.

Note that in the description below, the operating mode wherein the UMTS program starts up at the time of booting with the cellular telephone terminal that handles multi-boot as described above is called "UMTS mode".

Memory Mapping on NAND Memory at the Time of Handling Multi-Boot

FIG. 10B shows a memory mapping example in the case that the CDMA program, CDMA→GSM difference data, CDMA→UMTS difference data, and software converting engine are stored in the NAND memory 13. Note that FIG. 10B only shows the CDMA program, CDMA→GSM difference data, CDMA→UMTS difference data, software converting engine, and user data storage region, and other programs and data and so forth are omitted from the diagram.

Also, FIG. 10A shows a memory mapping example in the case that the three programs which are the CDMA program, GSM program, and UMTS program are independently stored in the NAND memory, as a comparison example as to the memory mapping of the present embodiment shown in FIG. 10B.

As we can see from FIG. 10B, in the case that the CDMA program, CDMA→GSM difference data, CDMA→UMTS difference data, and software converting engine are stored as in the present embodiment, a larger user data storage region can be secured as compared to FIG. 10A. That is to say, compared to the data amount of the CDMA program, GSM program, and UMTS program, the data amount of the CDMA→GSM difference data, CDMA→UMTS difference data, and software converting engine is far less. Therefore, in the case of FIG. 10B, the user data storage region is increased by an amount equivalent to the data amount of the CDMA→GSM difference data, CDMA→UMTS difference data, and software converting engine, subtracted from the data amount of the GSM program and UMTS program in FIG. 10A.

Note that in the case of multi-boot handling as described above, the memory mapping in the case that the GSM program or the like is stored in the NAND memory 13, in FIG. 10B the CDMA program is rewritten as GSM program, the CDMA→SM difference data is rewritten as GSM→CDMA difference data, and CDMA→UMTS difference data as GDM→UMTS difference data, and the diagrams and descriptions thereof are omitted. Similarly, in the case of multi-boot handling as described above, the memory mapping in the case that the UMTS program or the like is stored in the NAND memory 13, in FIG. 10B the CDMA program is rewritten as UMTS program, the CDMA→GSM difference data is rewritten as UMTS→GSM difference data, and CDMA→UMTS difference data as UMTS→CDMA difference data, and the diagrams and descriptions thereof are omitted.

Operations at the Time of Booting of Terminal Handling Multi-Boot

With the cellular telephone terminal of the present embodiment that handles multi-boot as described above, the modem processor 10 performs the startup processing as described below. With the cellular telephone terminal of the present embodiment that handles multi-boot, a case wherein the CDMA program, CDMA→GSM difference data, CDMA→UMTS difference data, and software converting engine are stored in the NAND memory 13, and the startup in UMTS mode has been selected beforehand by the user, will be described with reference to FIGS. 11A and 11B.

Figure 11A:
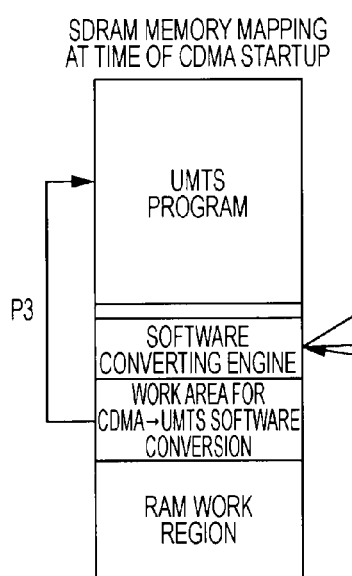
FIGS. 11A and 11B are diagrams describing startup processing in the case of startup in UMTS mode, in the case that a CDMA program and CDMA→GSM difference data and CDMA→UMTS difference data are stored in the NAND memory.
Figure 11B:
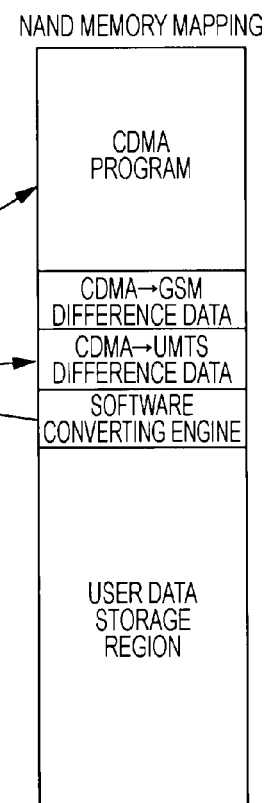

FIGS. 11A and 11B show a state of loading the program that the modem processor 10 executes at the time of booting up and data transfer processing, in the case that the CDMA program or the like is stored in the NAND memory 13 and that startup in UMTS mode has been selected beforehand by the user. Note that FIG. 11A illustrates memory mapping of the SDRAM memory 14, and FIG. 11B illustrates memory mapping of the NAND memory 13. However, FIG. 11B shows only the CDMA program, CDMA→GSM difference data, CDMA→UMTS difference data, software converting engine, and user data storage region, and other programs, data, and so forth are omitted from the diagram. Also, FIG. 11A shows only the program region and RAM work region, and the buffer region and so forth are omitted from the diagram.

Thus, with the cellular telephone terminal that handles multi-boot, in the case that the CDMA program or the like is stored in the NAND memory 13 and that startup in UMTS mode is selected beforehand by the user, the modem processor 10 during executing the boot control program first loads (P1) the software converting engine of the NAND memory 13 to the RAM work region of the SDRAM memory 14 and starts the program.

Next, the modem processor 10 during executing the software converting engine uses the software converting work region of the SDRAM memory 14 to create (P2) the UMTS program from the CDMA program and the CDMA→UMTS difference data in the NAND memory 13.

Also, the modem processor 10 during executing the software converting engine sequentially transfers and loads (P3) the UMTS program created in the software converting work region to a program region in the SDRAM memory 14.

Upon ending loading the entire UMTS program to the program region of the SDRAM memory 14, the modem processor 10 starts up the UMTS program. Thus, the cellular telephone terminals of the present embodiment can be started up in UMTS mode.

Note that in the case of handling multi-boot, if we say that the GSM program or the like is stored in the NAND memory 13, FIGS. 11A and 11B will be rewritten such that the portions written as CDMA are rewritten as GSM, and the portions written as GSM are rewritten as CDMA. The operations in the case of this example are the same as the flow in the above description, so will be omitted here. Similarly, in the case of handling multi-boot, if we say that the UMTS program or the like is stored in the NAND memory 13, FIGS. 11A and 11B will be rewritten such that the portions written as CDMA are rewritten as UMTS, and the portions written as UMTS are rewritten as CDMA. The operations in the case of this example are the same as the flow in the above description, so will be omitted here.

Also, in the case of handling multi-boot, in the case that the CDMA program or GSM program or UMTS program or the like is stored in the NAND memory 13, when the startup of the program stored in the NAND memory 13 is selected beforehand by the user, the program thereof is loaded to the program region of the SDRAM memory 14 without change. The operations in the case of this example are the same as the flow in the above description, so will be omitted here.

Flowchart of Operations at the Time of Booting of Terminal Handling Multi-Boot

Figure 12:
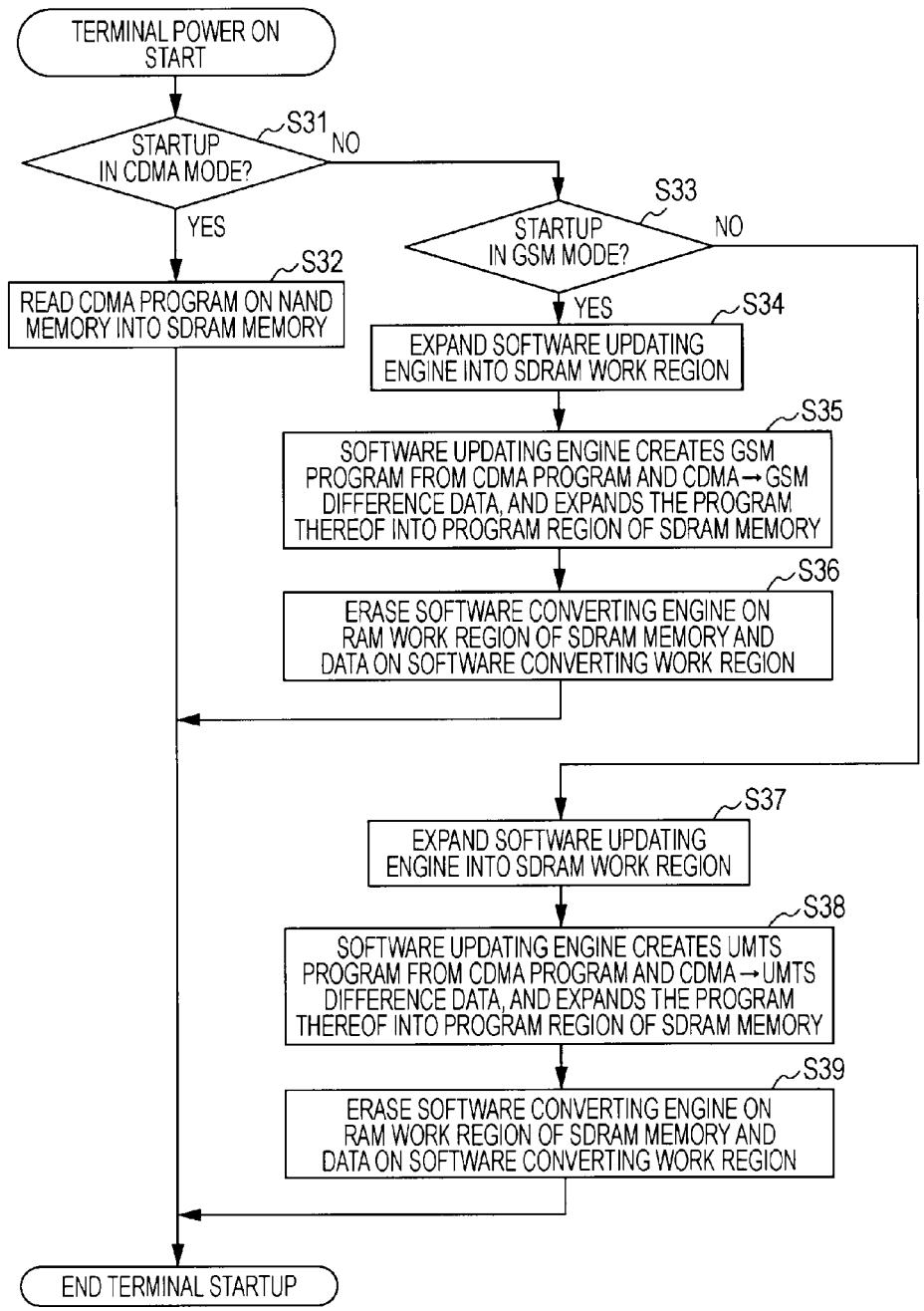
FIG. 12 is a flowchart describing the flow of processing executed with a modem processor at the time of booting, in the case that a CDMA program or the like is stored in the NAND memory of a cellular telephone terminal that handles multi-boot.

FIG. 12 illustrates the flow of processing executed by the modem processor 10 at the time of booting, in the case that for example the CDMA program or the like is stored in the NAND memory 13 of the terminal that handles multi-boot.

In FIG. 12, upon the startup processing being started by turning the power ON of the cellular telephone terminal or the like, the modem processor 10 references a user setting value saved in the NAND memory 13 and determines whether or not the user setting value is the value indicating CDMA mode, as processing in step S31. In the determining processing in step S31 the mode processor 10 advances the processing to step S32 in the case of determining that the CDMA mode is set, and on the other hand, advances the processing to step S33 in the case of determining that the GSM mode is set.

Upon advancing the processing to Step S32, the modem processor 10 loads the CDMA program on the NAND memory 13 to the program region of the SDRAM memory 14 without change, and starts up the loaded CDMA program. Thus, the cellular telephone terminal of the present embodiment can be started up in CDMA mode.

On the other hand, upon advancing to the processing in step S33, the modem processor 10 determines whether or not the user setting value is set to a value indicating GSM mode. In the determining processing in step S33, in the case the modem processor 10 determines that the GSM mode is set, the processing is advanced to step S34, and in the case of determining that the UMTS mode is set, the processing is advanced to step S37.

In the case of the processing advancing to step S34, the modem processor 10 loads and starts up the software converting engine in the NAND memory 13 to the RAM work region of the SDRAM memory 14, switches to execution of processing by the software converting engine, and advances the processing to step S35.

Upon advancing to the processing in step S35, the modem processor 10 uses the software converting work region of the SDRAM memory 14 to create the GSM program from the CDMA program and CDMA→GSM difference data in the NAND memory 13. Also, the modem processor 10 sequentially transfers the GSM program created on the software converting work region to the program region and loads the program.

Upon ending loading the entire GSM program to the program region of the SDRAM memory 14, the modem processor 10 erases the software converting engine on the RAM work region of the SDRAM memory 14 and the data in the software converting work region, as the processing in step S36.

Subsequently, the modem processor 10 starts up the GSM program that has been loaded to the program region of the SDRAM memory 14. Thus, the cellular telephone terminal of the present embodiment is started up in GSM mode. Note that the data erasing processing in step S35 may be performed after starting up the GSM program.

Also, similar to the case in step S34, in the case of advancing the processing from step S33 to step S37, the modem processor 10 loads the software converting engine on the NAND memory 13 to the RAM work region of the SDRAM memory 14. The modem processor 10 switches to executing processing by the software converting engine, and advances the processing to step S38.

Upon advancing processing to step S38, the modem processor 10 uses the software converting work region of the SDRAM memory 14 to create the UMTS program from the CDMA program on the NAND memory and the CDMA→UMTS difference data. Also, the modem processor 10 sequentially transfers the UMTS program created on the software converting work region to the program region and loads the program.

Upon ending loading the entire UMTS program to the program region of the SDRAM memory 14, the modem processor 10 erases the software converting engine on the RAM work region of the SDRAM memory 14 and the data in the software converting work region, as the processing in step S39.

Subsequently, the modem processor 10 starts up the UMTS program that has been loaded to the program region of the SDRAM memory 14. Thus, the cellular telephone terminal of the present embodiment is started up in UMTS mode. Note that the data erasing processing in step S39 may be performed after starting up the UMTS program.

Updating Software and Difference Data

As described above, with a cellular telephone terminal according to the present embodiment that can be switched as appropriate between CDMA mode, GSM mode, and UMTS mode for example and started up, in the case that software updates have to be made, updating is performed with the procedures such as described below. Note that with the cellular telephone terminal according to the present embodiment, software updates are performed using a software update function by so-called air downloading (FOTA: Firmware Over The Air updating).

First, a cellular telephone terminal that handles dual-boot wherein a CDMA program or the like is stored in the NAND memory 13 and which can be switched between CDMA mode and GSM mode and started up will be exemplified and described. With the description below, let us say that the version of the CDMA program at the time of shipping is "V01.00.00", this is changed to version "V01.00.01", and subsequently the newest version "V01.00.02" is released.

According to the present embodiment, the versions for both programs of the CDMA program and GSM program are defined as the same version. Also, according to the present embodiment, regarding the CDMA→GSM difference data, that which matches the CDMA program version is prepared, and the CDMA→GSM difference data update is also performed at the same time as the CDMA program update.

Figure 13:
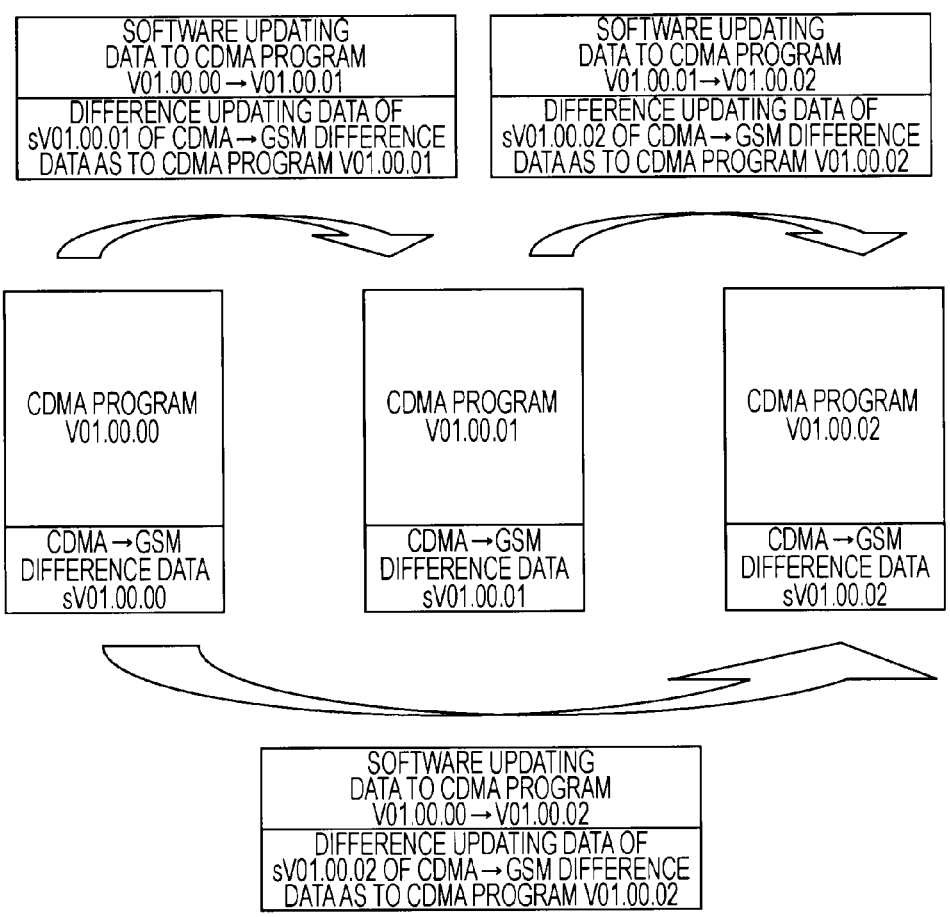
FIG. 13 is a diagram describing the relation of each version of the CDMA program and the CDMA→GSM difference data at the time of updating, at a cellular telephone terminal that handles dual-boot.

According to the present embodiment, as shown in FIG. 13, for example in the case that the CDMA program version at the current point-in-time is "V01.00.00" and this is updated to "V01.00.01", the software updating data of "V01.00.01" is downloaded for the CDMA program. On the other hand, regarding the CDMA→GSM difference data, the difference updating data of the version "sV01.00.01" is downloaded corresponding to the CDMA program version "V01.00.01" to be updated.

Also, as shown in FIG. 13, for example in the case that the CDMA program version at the current point-in-time is "V01.00.01" and this is updated to "V01.00.02", the software updating data of "V01.00.02" is downloaded for the CDMA program. On the other hand, regarding the CDMA→GSM difference data, the difference updating data of the version "sV01.00.02" is downloaded corresponding to the CDMA program version "V01.00.02" to be updated.

Also, as shown in FIG. 13, in the case that the CDMA program version at the current point-in-time is "V01.00.00" and this is updated to "V01.00.02", the software updating data of "V01.00.02" is downloaded for the CDMA program. On the other hand, regarding the CDMA→GSM difference data, the difference updating data of the version "sV01.00.02" is downloaded corresponding to the CDMA program version "V01.00.02" to be updated.

Thus, according to the present invention, the CDMA program is updated according to the updated versions, and the CDMA→GSM difference data is updated using difference updating data corresponding to the CDMA program version.

Note that version updating in the case that a GSM program or the like is stored in the NAND memory 13 can be also applied to a case of CDMA, by replacing CDMA with GSM in the above description, and accordingly the examples and description thereof will be omitted.

Operations at the Time of Software and Difference Data Updating

FIG. 14 shows the processing procedures in the event that updating is performed for the CDMA program and CDMA→GSM difference data, in the case that the CDMA or the like is stored in the NAND memory 13 as described above. Note that in FIG. 14, a case of updating the CDMA program version "V01.00.00" to "V01.00.02" is exemplified.

In FIG. 14, in the case that the CDMA program and CDMA→GSM difference data is updated, with the cellular telephone terminal according to the present embodiment, a download using the FOTA function is performed by the modem processor 10 executing an update control program.

The download data in this case is made up of software updating data for updating the CDMA program version "V01.00.00" to "V01.00.02" and the difference updating data for updating the CDMA→GSM difference data to version "sV01.00.02". The modem processor 10 during executing the update control program saves (P11) the download data to an updating data storage region prepared on the NAND memory 13.

Next, the modem processor 10 during executing the update control program loads the software converting engine of the NAND memory 13 to the RAM work region of the SDRAM memory 14, while transferring (P12) the downloaded software updating data and difference updating data to the RAM work region.

The modem processor 10 uses the software updating data to perform rewriting processing, i.e. updating processing (P13) of the old version "V01.00.00" CDMA program on the NAND memory 13 to the new version "V01.00.02" CDMA program with the loaded software converting engine. That is to say, according to the present embodiment, the software converting engine performs processing to convert the old version CDMA program into the new version CDMA program, as the updating processing at the time of updating. In other words, the software updating data of the CDMA program identifies program components in the old version CDMA program that differ from the new version CDMA program, while converting (replacing) the program components of the old version DMA program that have been identified with the program components of the new version CDMA program. Accordingly, the software converting engine realizes the updating processing at the time of updating, by executing similar processing as the above-described program converting processing.

Also, the modem processor 10 also performs CDMA→GSM difference data updating after the CDMA program updating processing (or in parallel with the updating processing thereof). That is to say, the modem processor 10 uses the difference updating data to perform rewriting processing, i.e. updating processing (P13), of the CDMA→GSM difference data on the NAND memory 13 to the CDMA→GSM difference data of version "sV01.00.02". Note that the difference updating data in this case is the CDMA→GSM difference data of the new version, and is data to overwrite the CDMA→GSM difference data of the old version on the NAND memory 13.

Thus, the CDMA program on the NAND memory 13 is updated (P14) from the old version "V01.00.00" to the new version "V01.00.02", while the CDMA→GSM difference data is also updated (P14) to the new version "sV01.00.02".

Note that in FIG. 14, an example is given wherein the CDMA program is updated from version "V01.00.00" to "V01.00.02", but similar processing is performed in the case that updating is performed to other versions.

Also with the above descriptions, an example is given to overwrite the old version CDMA→GSM difference data with a new version of difference updating data, but similar to the software updating data, the difference updating data also may be made to be data made up from the difference between the old version and the new version. That is to say, the difference updating data may identify program components in the old version CDMA→GSM difference data that differ from the new version CDMA→GSM difference data, while being the difference converting data for converting (replacing) the data components identified in the old version CDMA→GSM difference data with the new version CDMA→GSM difference data.

Also, the updating in the case that the GSM program or the like is stored in the NAND memory 13 can be also applied to a case of CDMA, by replacing CDMA with GSM in the above description, and accordingly the examples and description thereof will be omitted.

Software Version Managing According to Present Embodiment

As described above, according to the present embodiment, upon updating of the CDMA program being performed, the CDMA→GSM difference data is also performed to match the version of the updated program. Accordingly, with the present embodiment, upon completing the update of the CDMA program, in the case that startup is performed in GSM mode for example, startup can be performed with a GSM program that has been automatically updated with the updated version of the CDMA program and CDMA→GSM difference data.

Also, according to the present embodiment, upon updating the CDMA program and CDMA→GSM difference data, the GSM program version is also automatically updated at the same time, whereby managing the versions for each of the CDMA program and GSM program becomes extremely simple.

Differences in version managing by updating the CDMA program and CDMA→GSM difference data according to the present embodiment and version managing in the case of storing both the CDMA program and GSM program in the NAND memory and so forth will be described as a comparison example thereto, with reference to FIGS. 15 through 17. Note that FIG. 15 shows the content to be managed at the time of updating the CDMA program version according to the present embodiment, and FIG. 16 shows the content to be managed at the time of updating the CDMA→GSM difference data version. Also, FIG. 17 shows the content to be managed at the time of updating the GSM program version in particular, in the case that both the CDMA program and GSM program are stored in the NAND memory or the like, as a comparison example to FIGS. 15 and 16.

In the case of an embodiment of the present invention, the information to be managing at the time of updating is only the CDMA program version and the CDMA→GSM difference data version corresponding to the version of the CDMA program thereof. That is to say in the case of the present embodiment, regarding the CDMA program, at the time that the updated version is "V01.00.00", the updatable versions "V01.00.01" and "V01.00.02" are managed, as shown in FIG. 15. Also, at the time that the before-updating version is "V01.00.01", the updatable version "V01.00.02" is managed.

Also, according to the present embodiment, regarding the CDMA→GSM difference data, at the time that the CDMA program version is "V01.00.00", only the corresponding version "sV01.00.00" has to be managed, as shown in FIG. 16. Also, at the time that the CDMA program version is "V01.00.01", only the "sV01.00.01" version of the CDMA→GSM difference data which corresponds to the CDMA program version has to be managed. Similarly, at the time that the CDMA program version is "V01.00.02", only the corresponding version "sV01.00.02" of the CDMA→GSM difference data has to be managed. That is to say, according to the present embodiment, at the time that the CDMA program version is updated, only managing has to be performed so as to match the version of the CDMA→GSM difference data and the version of the CDMA program, and since the version of the GSM program does not have to be managed at all, version managing becomes extremely simple.

On the other hand, in a case such that both the CDMA program and GSM program are stored in the NAND memory or the like, as shown in FIGS. 15 and 17, updatable versions have to be managed for both of the programs thereof. That is to say, as shown in FIGS. 15 and 17, for both the CDMA program and GSM program, at the time that the version before updating is "V01.00.00", the updatable versions of "V01.00.01" and "V01.00.02" each have to be managed. Similarly for both the CDMA program and GSM program, at the time that the version before updating is "V01.00.01" for each program, the updatable versions of "V01.00.02" have to be managed for each program. In other words, in the case that both the CDMA and GSM programs are stored in the NAND memory, for example even if the CDMA program version is "V01.00.02", the GSM program version can remain at "V00.00.00" for example, and version managing for each program has to be performed and managing becomes extremely complicated.

Conversely in the case of the present embodiment, the version of the CDMA→GSM difference data is linked to the CDMA program version, whereby actually only the CDMA program version has to be managed, and since the GSM program does not have to be managed, version managing becomes extremely simple.

Figure 18:
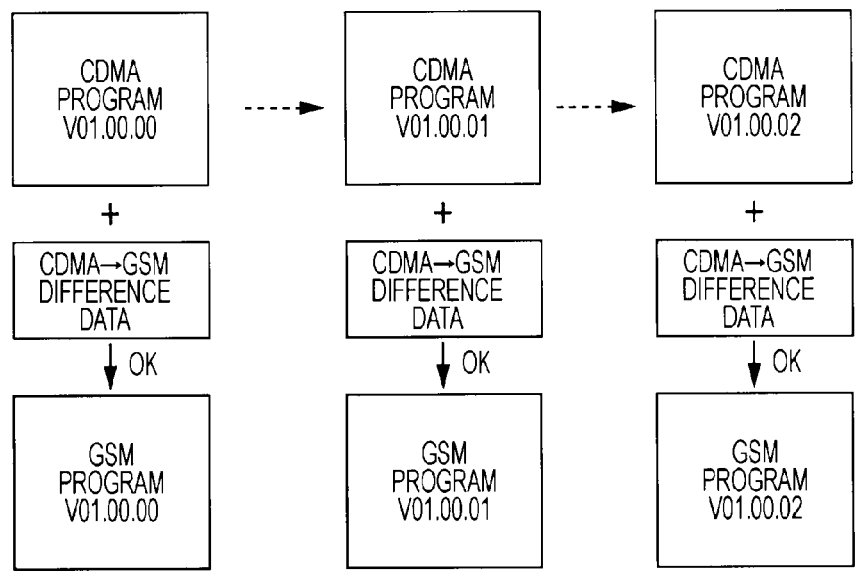
FIG. 18 is a diagram describing a version update in the case that the same CDMA→GSM difference data is used for each version of the CDMA program.

Note that with the present embodiment, and example is given to update the CDMA→GSM difference data at the same time as updating the CDMA program, but the present invention is applicable even in a case that the same CDMA→GSM difference data is used for various versions of the CDMA program for example. That is to say, as shown in FIG. 18 for example, even in a case that the CDMA program versions are sequentially updated but the CDMA→GSM difference data uses shared data for each of the versions thereof, an automatically updated version of the GSM program can be generated from the various versions of the CDMA program and the shared CDMA→GSM difference data.

Operation Flowchart at the Time of Updating

Figure 19:
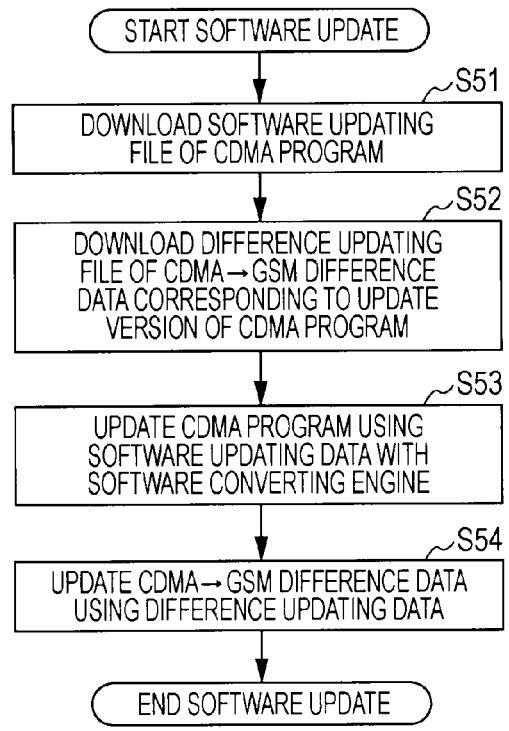
FIG. 19 is a flowchart describing the flow of updating processing executed with a modem processing at a dual boot terminal wherein a CDMA program or the like is stored in NAND memory.

FIG. 19 shows the processing flow in the event that the modem processor 10 executes the updating control program relating to the present embodiment and performing the above-described updating, with a dual-boot terminal that has the CDMA program or the like stored in the NAND memory 13.

The modem processor 10 of the cellular telephone terminal starts the software updating processing with update instruction input from a user or automatic update settings or the like for example, and in the case that an update actually has to be performed, the processing in the flowchart shown in FIG. 19 is started.

Upon the processing in the flowchart in FIG. 19 starting, the modem processor 10 first as processing in step S51, obtains a file for software updating data of the CDMA program from a download with a FOTA function for example, and stores the file thereof in the NAND memory 13.

Also, as processing in step S52, the modem processor 10 obtains a difference updating data file of CDMA→GSM difference data that corresponds to the version of the CDMA program downloaded in step S51, from a download with a FOTA function, and stores the file thereof in the NAND memory 13.

Upon the downloads completing for both files of the CDMA program software updating data and the difference updating data, the modem processor 10 uses the downloaded CDMA program software updating data to update the CDMA program with the software converting engine, as processing in step S53.

Also, as processing in step S54, the modem processor 10 uses the difference updating data of the downloaded CDMA→GSM difference data to update the CDMA→GSM difference data.

Updating Multi-Boot Terminal Software and Difference Data

The above description describes a software update of a dual-boot terminal, but in the case that the cellular telephone terminal of the present embodiment is a terminal that handles multi-boot, the updating is performed as described below. Note that with the description below, multi-boot terminal is exemplified which can start up with any of a CDMA mode, GSM mode, and UMTS mode.

Figure 20:
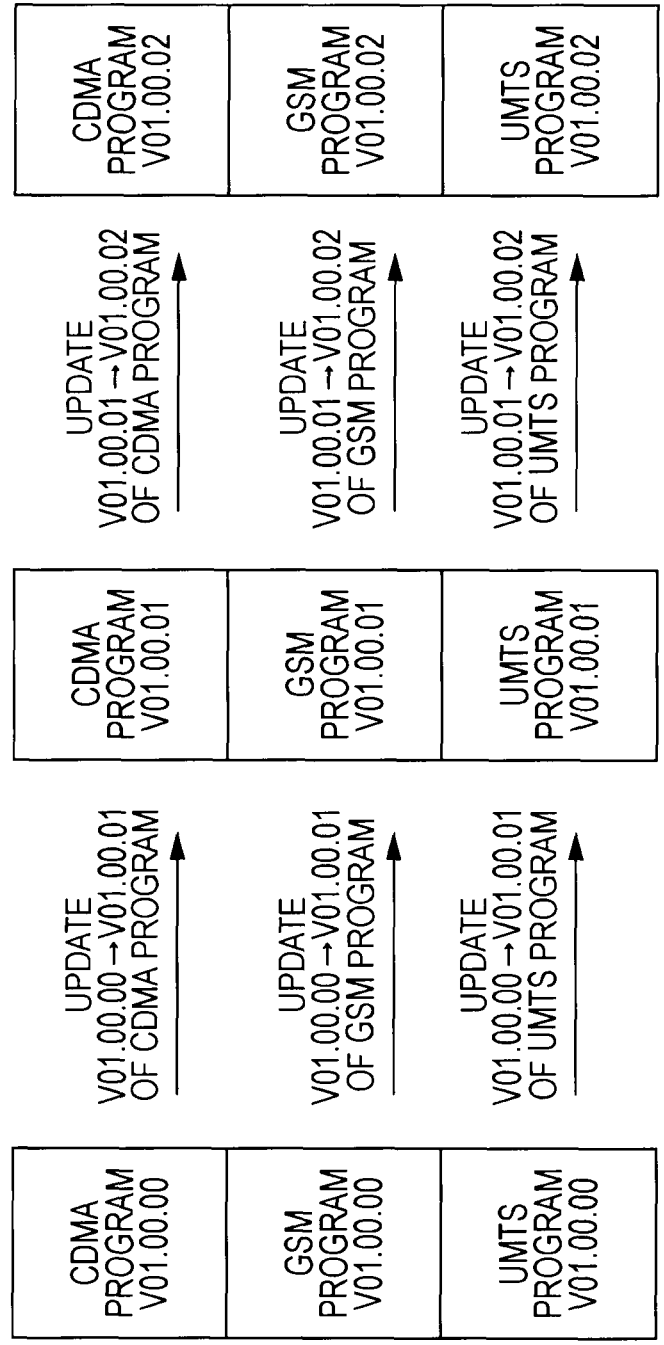
FIG. 20 is a diagram describing updating processing of three programs of CDMA, GSM, and UMTS, in the case that these three programs are stored in internal memory of the terminal of a cellular telephone terminal that handles multi-boot.

With a cellular telephone terminal that handles multi-boot, in the case that the three programs of CDMA, GSM, and UMTS are stored in the memory within the terminal, each of the three programs have to be updated, as exemplified in FIG. 20. That is to say, for example, the three programs have to be individually updated from the version "V01.00.00" at the time of shipping to "V01.00.01", and further from "V01.00.01" to "V01.00.02".

Figure 21:
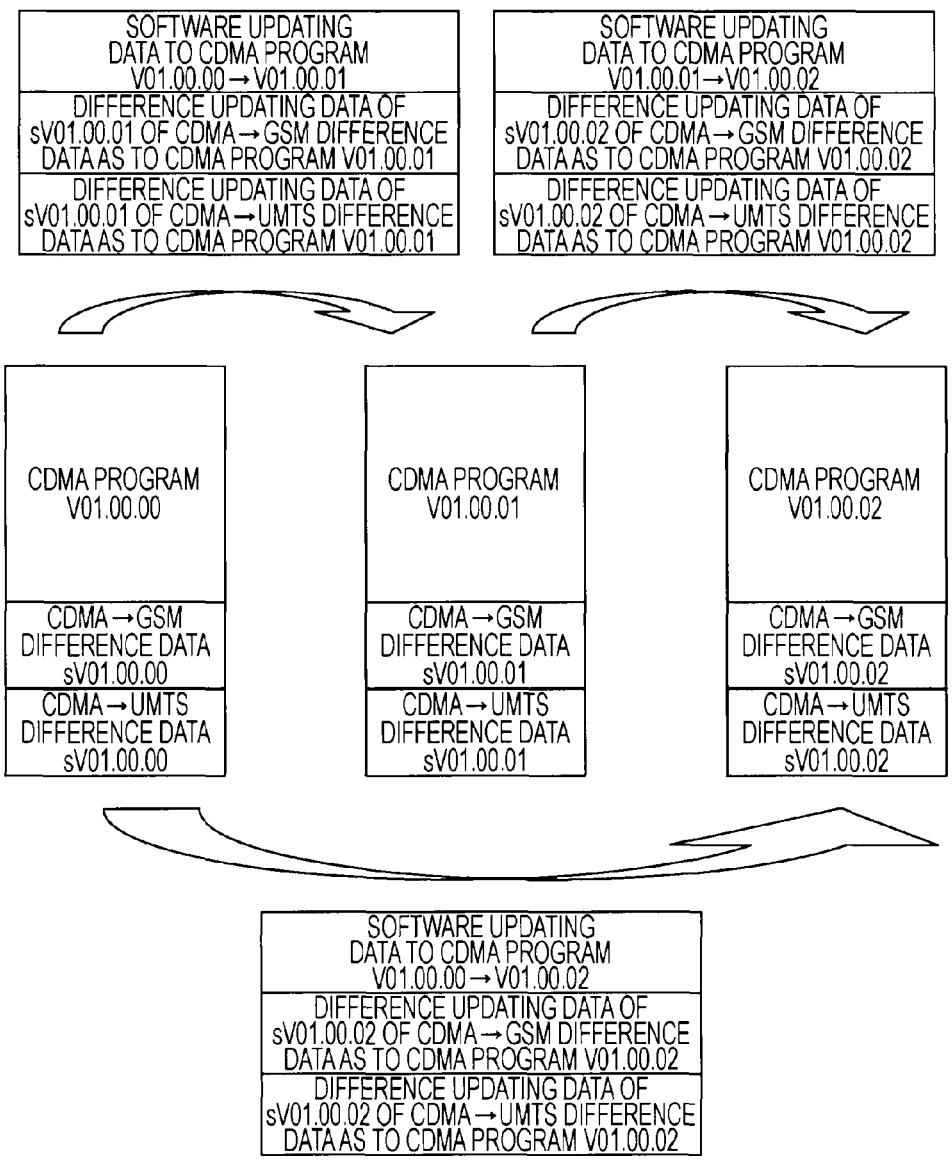
FIG. 21 is a diagram describing the relation of each version of the CDMA program and the CDMA→GSM difference data and the CDMA→UMTS difference data at the time of updating, at a cellular telephone terminal that handles multi-boot.

Conversely, in the case of the cellular telephone terminal that handles multi-boot according to the present embodiment, updating is performed as shown in FIG. 21. Note that with the description below, let us say that a CDMA program or the like is stored in the NAND memory 13, and the CDMA program version at the time of terminal shipment is "V01.00.00", the version is updated to "V01.00.01", and subsequently the newest version "V01.00.02" is released.

Similar to the case of the above-described dual-boot handling, with the cellular telephone terminal that handles multi-boot according to the present embodiment, the versions of all of the programs which are the CDMA program, GSM program, and UMTS program, are defined as the same version. Also according to the present embodiment, regarding the CDMA→GSM difference data and CDMA→UMTS difference data, that which matches the version of the CDMA program is prepared for each, and the updates of the CDMA→GSM difference data and CDMA→UMTS difference data are also updated at the same time as the CDMA program updates.

With the present embodiment, as shown in FIG. 21, for example in the case that the CDMA program version at the current point in time is "V01.00.00", and this is updated to "V01.00.01" as shown in FIG. 21, the software updating data is downloaded for version "V01.00.01" of the CDMA program. On the other hand, regarding the CDMA→GSM difference data and CDMA→UMTS difference data, the difference updating data of the version "sV01.00.01" that corresponds to the version "V01.00.01" of the updated CDMA program is downloaded for each.

Also, as shown in FIG. 21, for example in the case that the CDMA program version at the current point in time is "V01.00.01", and this is updated to "V01.00.02" as shown in FIG. 21, the software updating data is downloaded for version "V01.00.02" of the CDMA program. On the other hand, regarding the CDMA→GSM difference data and CDMA→UMTS difference data, the difference updating data of the version "sV01.00.02" that corresponds to the version "V01.00.02" of the updated CDMA program is downloaded for each.

Similarly, as shown in FIG. 21, for example in the case that the CDMA program version at the current point in time is "V01.00.00", and this is updated to "V01.00.02" as shown in FIG. 21, the software updating data is downloaded for version "V01.00.02" of the CDMA program. On the other hand, regarding the CDMA→GSM difference data and CDMA→UMTS difference data, the difference updating data of the version "sV01.00.02" that corresponds to the version "V01.00.02" of the updated CDMA program is downloaded for each.

Thus, even with a cellular telephone terminal that handles multi-boot, similar to the case of the above-described dual-boot terminal, at the time that updating of the CDMA program is performed, updating using the difference updating data is performed for the CDMA→GSM difference data and CDMA→UMTS difference data also at the same time.

Note that updating versions in the case that the GSM program or the like, or the UMTS program or the like, is stored in the NAND memory 13 can be also applied to a case of CDMA, by replacing CDMA with GSM in the above description, or by replacing CDMA with UMTS, and accordingly the examples and description thereof will be omitted.

Figure 22:
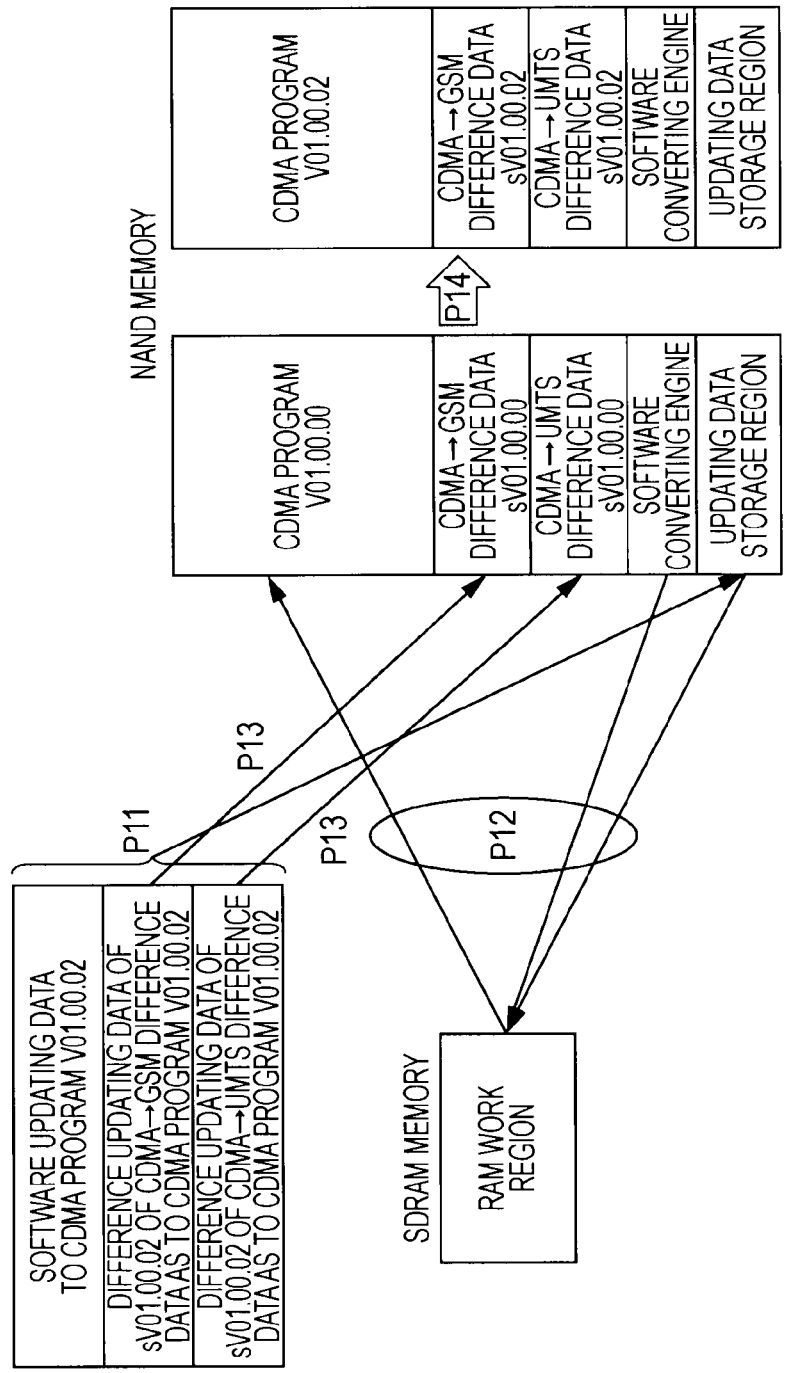
FIG. 22 is a diagram describing a processing sequence at the time of updating the CDMA program and the CDMA→GSM difference data and the CDMA→UMTS difference data, at a cellular telephone terminal that handles multi-boot.
Figure 25:
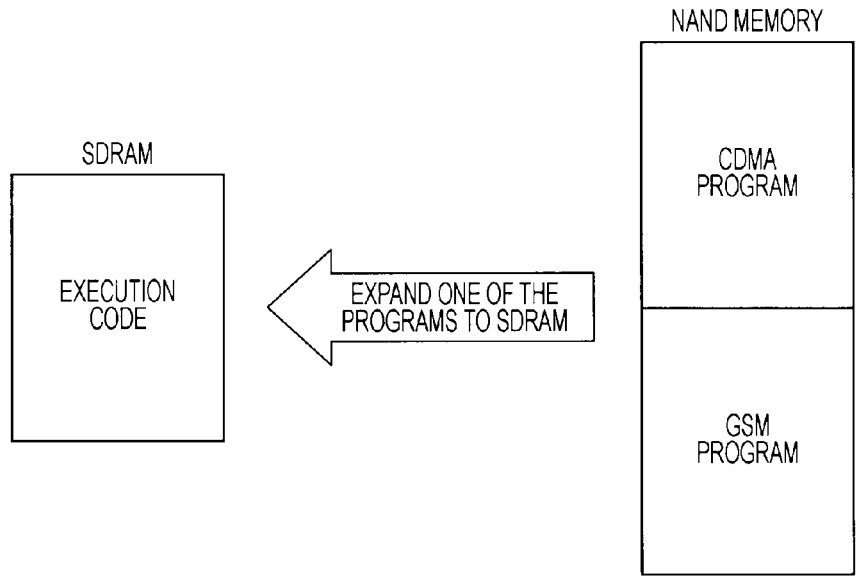
FIG. 25 is a diagram describing a program loaded to SDRAM memory at the time of booting, at a currently used dual-boot terminal wherein CDMA program and GSM program are each independently prepared beforehand.
Figure 26:
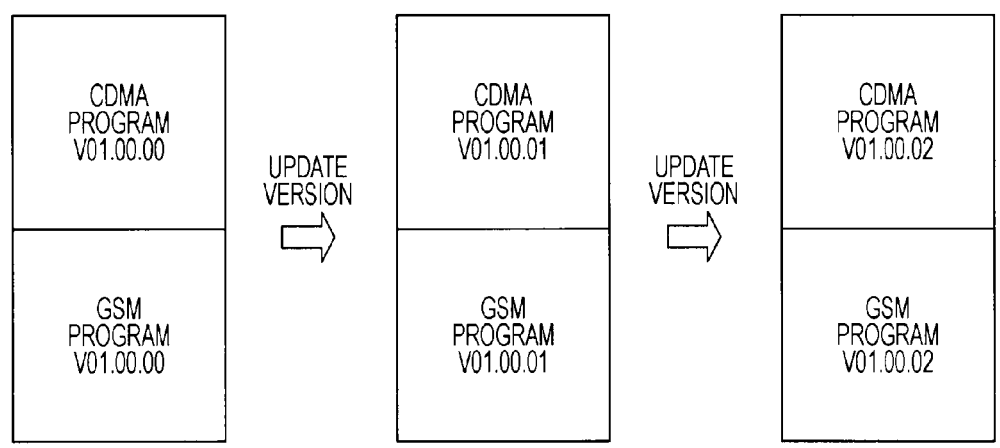
FIG. 26 is a diagram describing updating processing of two programs, at a currently used dual-boot terminal wherein CDMA program and GSM program are each independently prepared beforehand.

Operations at the Time of Software and Difference Data Updating in Multi-Boot Terminal FIG. 22 shows processing procedures in the event that, in multi-boot terminal, a CDMA program or the like is stored in the NAND memory 13, and the CDMA program, CDMA→GSM difference data, and CDMA→UMTS difference data is updated. Note that in FIG. 22, an example is given wherein the CDMA program version "V01.00.00" is updated to "V01.00.02".

In FIG. 22, downloading is performed with a FOTA function by execution of the update control program by the modem processor 10. The download data in the case of this example is made up of software updating data for updating the CDMA program version "V01.00.00" to "V01.00.02", and difference updating data for updating the CDMA→GSM difference data and CDMA→UMTS difference data each to "sV01.00.02". The modem processor 10 during executing the updating control program saves (P11) the download data in an updating data storage region that is prepared on the NAND memory 13.

Next, the modem processor 10 loads (P12) the software converting engine of the NAND memory 13 to the RAM work region of the SDRAM memory 14, while transferring (P12) the downloaded software updating data and difference updating data to the RAM work region.

The modem processor 10 uses the software updating data to perform rewriting processing, i.e. updating processing (P13) of the old version CDMA program "V01.00.00" on the NAND memory 13 to the new version CDMA"V01.00.02", similar to that described above.

Also, the modem processor 10 performs updating of the CDMA→GSM difference data and CDMA→UMTS difference data. That is to say, the modem processor 10 uses the difference updating data to perform rewriting processing, i.e. updating processing (P13) of each of the old versions of CDMA→GSM difference data and CDMA→UMTS difference data to the new version "sV01.00.02" CDMA→GSM difference data and CDMA→UMTS difference data.

Thus, the CDMA program on the NAND memory 13 is updated (P14) from the old version "V01.00.00" to the new version "V01.00.02", while the CDMA→GSM difference data and CDMA→UMTS difference data is updated to the new version "sV01.00.02".

Note that the updating in the case that a GSM program or UMTS program or the like is stored in the NAND memory 13, with the above description, can be also applied to other cases, by replacing the CDMA with GSM, or replacing the CDMA with UMTS, and accordingly the examples and descriptions thereof will be omitted.

Software Version Managing in Multi-Boot Terminal

With the above-described cellular telephone terminal that handles multi-boot, version updates of the CDMA program and CDMA→GSM difference data and CDMA→UMTS difference data are performed at the same time, and also the versions of the GSM program and UMTS program based on the version updates are also automatically updated, whereby managing the various versions becomes extremely simple.

That is to say, in the case of the present embodiment, with the CDMA program, version managing before and after updating is performed, and version managing of the CDMA→GSM difference data is performed as shown in FIG. 16 described above.

Further, in the case of a terminal that handles multi-boot, with regard to the CDMA→UMTS difference data, as with the CDMA→GSM difference data, as shown in FIG. 23, at the time that the CDMA program version is "V01.00.00", only whether or not the CDMA→UMTS difference data is the corresponding version "sV01.00.00" has to be managed. Also, at the time that the CDMA program version is "V01.00.01", only whether or not the CDMA→UMTS difference data is the corresponding version "sV01.00.01" has to be managed. Similarly, at the time that the CDMA program version is "V01.00.02", only whether or not the CDMA→UMTS difference data is the corresponding version "sV01.00.02" has to be managed. That is to say, according to the present embodiment, similar to the above-described CDMA→GSM difference data, the version of the CDMA→UMTS difference data only has to be managed regarding whether the version is corresponding to the version of the CDMA program.

Thus, according to the terminal that handles multi-boot according to the present embodiment, in the case that a CDMA program or the like is stored in the NADN memory 13, the GSM program does not have to be managed, and also the UMTS program does not have to be managed, the version managing becomes extremely simple. That is to say, for example in the case that the old version of the CDMA program is "V01.00.00" and this is to be updated to the new version "V01.00.02", according to the present embodiment, the only information that has to be managed is the software updating data of the CDMA program and both sets of difference updating data of the CDMA→GSM difference data and CDMA→UMTS difference data for a total of three pieces of information. Conversely, in the case of managing each of the three of the CDMA program, GSM program, and UMTS program as in the above-described FIG. 20, a total of six sets of software updating data have to be managed.

Note that in this example, multi-boot with three programs is exemplified, but even in a case that the number of programs increases, according to the present embodiment version managing is simple, and as the number of programs increase, the advantages of embodiments of the present invention increase.

Operation Flowchart at the Time of Updating in Multi-Boot Terminal

FIG. 24 shows the processing flow in the event that the modem processor 10 executes the updating control program relating to the present embodiment and performs the above-described updating, with multi-boot terminal that has the CDMA program or the like stored in the NAND memory 13.

The modem processor 10 of the cellular telephone terminal starts the software updating processing with update instruction input from a user or automatic update settings or the like for example, and in the case that an update actually has to be performed, the processing in the flowchart shown in FIG. 24 is started.

Upon the processing in the flowchart in FIG. 24 starting, the modem processor 10 first as processing in step S61, starts a download with a FOTA function, and obtains the software updating data file of the CDMA program.

Also, as processing in step S62, the modem processor 10 downloads (obtains) a difference updating data file of CDMA→GSM difference data that corresponds to the version of the CDMA program downloaded in step S61.

Similarly, as processing in step S63, the modem processor 10 downloads (obtains) a difference updating data file of CDMA→GSM difference data that corresponds to the version of the CDMA program downloaded in step S61.

Upon the downloads completing for both files of the CDMA program software updating data and the difference updating data, the modem processor 10 uses the downloaded CDMA program software updating data to update the CDMA program with the software converting engine, as processing in step S64.

Also, as processing in step S65, the modem processor 10 updates the CDMA→GSM difference data using the difference updating data of the downloaded CDMA→GSM difference data.

Similarly, as processing in step S66, the modem processor 10 updates the CDMA→UMTS difference data using the difference updating data of the downloaded CDMA→GSM difference data.

As described above, according to embodiments of the present invention, one program that is selectively started at the time of booting and software converting data (difference data) for converting the program thereof to another program is stored. According to embodiments of the present invention, greater memory capacity for a user data storage region and so forth can be secured in the NAND memory 13, and the memory capacity can be effectively used.

Also, according to embodiments of the present invention, at the same time as updating of the program stored in the NAND memory 13, the software converting data (difference data) is also updated to match the update version of the program thereof. Thus, according to embodiments of the present invention, programs other than the program stored in the NAND memory 13 does not have to be managed at all, whereby version managing operations at the time of updating becomes extremely simple.

The present application contains subject matter related to that disclosed in Japanese Priority Patent Application JP 2008-208006 filed in the Japan Patent Office on Aug. 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal comprising:
   a memory that stores at least
      a first program, which when executed by the portable terminal, causes the portable terminal to communicate according to a first communication method, and
      software converting data to convert said first program into a second program, which when executed by the portable terminal, causes the portable terminal to communicate according to a second communication method that is different from the first communication method; and
   circuitry configured to:
      perform reading and writing of the first program and data as to said memory;
      execute processing that converts said first program into the second program, using the first program and the software converting data read from the memory; and
      execute, at a time of terminal startup, one or the other of starting up said first program, and starting up the conversion processing from the first program to the second program and the second program that has been converted, wherein
the first communication method is a Code Division Multiple Access (CDMA) communication method and the second method is a Global Systems for Mobile (GSM) communication method.

2. The portable terminal according to claim 1, wherein the memory stores multiple software converting data for converting said first program into a plurality of different second programs.

3. The portable terminal according to one of claim 1 or claim 2, wherein
said circuitry is configured to
obtain software updating data for updating an old version of the first program stored in the memory into a new version of the first program and software converting data corresponding to the new version of said first program;
update said old version of the first program into the new version of the first program using the obtained software updating data; and
overwrite said first program after updating and said software converting data onto the memory.

4. A portable terminal control method comprising:
reading, by circuitry, a first program and software converting data from a memory that stores at least
a first program, which when executed by a portable terminal, causes the portable terminal to communicate according to a first communication method, and
software converting data to convert said first program into a second program, which when executed by the portable terminal, causes the portable terminal to communicate according to a second communication method that is different from the first communication method;
executing, by the circuitry, processing to convert said first program to the second program using the first program and the software converting data read from the memory; and
executing, by the circuitry, at a time of terminal startup, one or the other of
starting up said first program, and
starting up the conversion processing from the first program to the second program and the second program that has been converted, wherein
the first communication method is a Code Division Multiple Access (CDMA) communication method and the second method is a Global Systems for Mobile (GSM) communication method.

5. The portable terminal control method according to claim 4, further comprising:
obtaining software updating data for updating an old version of the first program stored in the memory into a new version of the first program and software converting data corresponding to the new version of said first program, and
updating said old version of the first program into the new version of the first program using the obtained software updating data; and
overwriting by said circuitry, said first program after updating and said software converting data, onto the memory.

6. A non-transitory computer-readable medium including a portable terminal control program, which when executed by a processor of a portable terminal, causes the portable terminal to execute:
performing program and data reading and writing as to a memory wherein at least a first program, which when executed by the portable terminal, causes the portable terminal to communicate according to a first communication method, and software converting data to convert said first program into a second program, which when executed by the portable terminal, causes the portable terminal to communicate according to a second communication method that is different from the first communication method, are stored;
processing to convert from said first program to the second program, using the first program and the software converting data read from the memory; and
execute, at a time of terminal startup, one or the other of
starting up said first program, and
starting up the conversion processing from the first program to the second program and the second program that has been converted, according to startup setting values determined beforehand, wherein
the first communication method is a Code Division Multiple Access (CDMA) communication method and the second method is a Global Systems for Mobile (GSM) communication method.

7. The non-transitory computer-readable medium according to claim 6, further causing the portable terminal to execute:
obtaining software updating data for updating an old version of the first program stored in the memory into a new version of the first program and the software converting data corresponding to the new version of the first program;
updating the old version of the first program into the new version of the first program using the obtained software updating data; and
overwriting the first program after updating and the software converting data on the memory.

8. The portable terminal according to claim 1, wherein the software converting data includes difference data indicating a difference between the first program that causes the portable terminal to communicate according to the CDMA communication method and the second program that causes the portable terminal to communicate according to the GSM communication method.

9. A portable terminal comprising:
a memory that stores at least
a first program, which when executed by the portable terminal, causes the portable terminal to communicate according to a first communication method, and
software converting data to convert said first program into a second program, which when executed by the portable terminal, causes the portable terminal to communicate according to a second communication method that is different from the first communication method; and
circuitry configured to:
perform reading and writing of the first program and data as to said memory;
execute processing that converts said first program into the second program, using the first program and the software converting data read from the memory; and
execute, at a time of terminal startup, one or the other of
starting up said first program, and
starting up the conversion processing from the first program to the second program and the second program that has been converted, wherein
the first communication method is a Global Systems for Mobile (GSM) communication method and the second method is a Code Division Multiple Access (CDMA) communication method.

10. The portable terminal according to claim 1, wherein the software converting data identifies program components in the first program that are different from the second program, and includes data to convert the program components identified in the first program into program components for the second program.

11. The portable terminal according to claim 1, wherein the software converting data is stored by the memory at the time of the terminal startup.

12. The portable terminal according to claim 1, wherein the software converting data does not include any update information.

13. The portable terminal according to claim 9, wherein the software converting data includes difference data indicating a difference between the first program that causes the portable terminal to communicate according to the GSM communication method and the second program that causes the portable terminal to communicate according to the CDMA communication method.

14. A portable terminal control method comprising:
reading, by circuitry, a first program and software converting data from a memory that stores at least
a first program, which when executed by a portable terminal, causes the portable terminal to communicate according to a first communication method, and
software converting data to convert said first program into a second program, which when executed by the portable terminal, causes the portable terminal to communicate according to a second communication method that is different from the first communication method;
executing, by the circuitry, processing to convert said first program to the second program using the first program and the software converting data read from the memory; and
executing, by the circuitry, at a time of terminal startup, one or the other of
starting up said first program, and
starting up the conversion processing from the first program to the second program and the second program that has been converted, wherein
the first communication method is a Global Systems for Mobile (GSM) communication method and the second method is a Code Division Multiple Access (CDMA) communication method.

15. A non-transitory computer-readable medium including a portable terminal control program, which when executed by a processor of a portable terminal, causes the portable terminal to execute:
performing program and data reading and writing as to a memory wherein at least a first program, which when executed by the portable terminal, causes the portable terminal to communicate according to a first communication method, and software converting data to convert said first program into a second program, which when executed by the portable terminal, causes the portable terminal to communicate according to a second communication method that is different from the first communication method, are stored;
processing to convert from said first program to the second program, using the first program and the software converting data read from the memory; and
execute, at a time of terminal startup, one or the other of
starting up said first program, and
starting up the conversion processing from the first program to the second program and the second program that has been converted, according to startup setting values determined beforehand, wherein
the first communication method is a Global Systems for Mobile (GSM) communication method and the second method is a Code Division Multiple Access (CDMA) communication method.

* * * * *